(12) United States Patent
Kobayashi

(10) Patent No.: US 9,342,018 B2
(45) Date of Patent: May 17, 2016

(54) IMAGE FORMING APPARATUS WITH AUTOMATIC SIZE DETERMINATION

(71) Applicant: Oki Data Corporation, Tokyo (JP)

(72) Inventor: Junji Kobayashi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 25 days.

(21) Appl. No.: 14/276,379

(22) Filed: May 13, 2014

(65) Prior Publication Data

US 2014/0341598 A1 Nov. 20, 2014

(30) Foreign Application Priority Data

May 17, 2013 (JP) ................................. 2013-104883

(51) Int. Cl.
*G03G 15/00* (2006.01)
*G06F 3/12* (2006.01)

(52) U.S. Cl.
CPC ............ *G03G 15/5029* (2013.01); *G06F 3/121* (2013.01); *G06F 3/1255* (2013.01); *G06F 3/1285* (2013.01); *G03G 15/5016* (2013.01); *G03G 15/5062* (2013.01); *G03G 15/5087* (2013.01); *G03G 15/5095* (2013.01); *G03G 2215/00329* (2013.01); *G03G 2215/00333* (2013.01)

(58) Field of Classification Search
CPC .......... G03G 15/5016; G03G 15/5029; G03G 15/5062; G03G 15/5087; G03G 15/5095; G03G 2215/00329; G03G 2215/00333; G06F 3/121; G06F 3/1255; G06F 3/1285
See application file for complete search history.

(56) References Cited

U.S. PATENT DOCUMENTS 5,321,486 A * 6/1994 Nanbu et al. .................... 399/14
6,283,653 B1 9/2001 Higuchi
2008/0260414 A1 10/2008 Okamura

FOREIGN PATENT DOCUMENTS

JP 2009-226665 A 10/2009

* cited by examiner

*Primary Examiner* — Joseph S Wong
(74) *Attorney, Agent, or Firm* — Rabin & Berdo, P.C.

(57) ABSTRACT

An image forming apparatus includes a medium storing portion storing a recording medium, and a storage unit that stores first size information indicating a size of the stored recording medium. A receiving unit receives print data containing image data and second size information indicating a size relating to the image data. A feeding unit feeds the recording medium from the medium storage portion. An image forming unit forms an image on the recording medium. A detection unit detects a size of the recording medium fed by the feeding unit to obtain third size information. A first determining unit determines whether the first size information corresponds to the second size information. A second determining unit determines whether the third size information corresponds to the second size information. An acquiring unit acquires determination instruction information. A determination control unit causes only the second determining unit to perform determination according to the determination instruction information.

11 Claims, 17 Drawing Sheets

FIG. 8

| CATEGORY | FUNCTION ITEMS | SELECTIONS | DEFAULT |
|---|---|---|---|
| PRINT SETTINGS | NUMBER OF COPIES | 1~999 | 1 |
| | DOUBLE PRINTING | ON<br>OFF | OFF |
| | ... | ... | ... |
| | MEDIUM SIZE CHECK MODE | • FULL EXECUTION<br>• INEXECUTION<br>• PARTIAL EXECUTION | FULL EXECUTION |

| MEDIUM SIZE CHECK MODE | MEDIUM SIZE CHECK | | OPERATION WHEN SIZE MISMATCH IS DETECTED |
|---|---|---|---|
| | (A) BEFORE PRINTING OPERATION | (B) DURING PRINTING OPERATION | |
| 1: FULL EXECUTION | A: EXECUTED | B: EXECUTED | A: DISPLAY MESSAGE PROMPTING REPLACEMENT OF RECORDING MEDIUM, AND DEFER PRINT OPERATION<br>B: DISPLAY SIZE ERROR MESSAGE, AND STOP PRINT OPERATION |
| 2: IN EXECUTION | A: NOT EXECUTED | B: NOT EXECUTED | A: START PRINT OPERATION (WITHOUT DISPLAYING SIZE ERROR MESSAGE)<br>B: CONTINUE PRINT OPERAITON (WITHOUT DISPLAYING SIZE ERROR MESSAGE) |
| 3: PARTIAL EXECUTION | A: NOT EXECUTED | B: EXECUTED | A: START PRINT OPERATION (WITHOUT DISPLAYING SIZE ERROR MESSAGE)<br>B: DISPLAY SIZE ERROR MESSAGE AND STOP PRINT OPERATION |

NOTE:
(A) "MEDIUM SIZE CHECK BEFORE PRINTING OPERAION" IS TO COMPARE PRINT JOB DATA AND SIZE OF RECORDING MEDIUM (STORED IN TRAY) RECOGNIZED BY IMAGE FORMING APPARATUS
(B) "MEDIUM SIZE CHECK DURING PRINTING OPERAION" IS TO COMPARE PRINT JOB DATA AND SIZE OF RECORDING MEDIUM (TRANSPORTED BY IMAGE FORMING APPARATUS) MEASURED BY IMAGE FORMING APPARATUS

FIG. 15A (LINE 1) PRINTING 2/5 PAGE JOB
(LINE 2) PLEASE PREPARE TO REPLACE TONER CARTRIDGE

FIG. 15B (LINE 1) PRINTING 2/5 PAGE JOB [SIZE CHECK MODE "3"]
(LINE 2) PLEASE PREPARE TO REPLACE TONER CARTRIDGE

FIG. 15C (LINE 1) PRINTING 2/5 PAGE JOB [SIZE CHECK MODE "3"]
(LINE 2) JOB DATA SIZE : A4 / RECOGNIZED SIZE : LETTER

IMAGE FORMING APPARATUS WITH AUTOMATIC SIZE DETERMINATION

BACKGROUND OF THE INVENTION

The present invention relates to an image forming apparatus including a medium storage portion capable of storing recording media of a plurality of sizes, and an image forming system in which the image forming apparatus is communicably connected to an information processing apparatus (for example, a host device).

A conventional image forming apparatus includes a medium storage portion capable of storing recording media of a plurality of sizes, and a detection unit that detects a size of the recording media stored in the medium storage portion (see, for example, Japanese Laid-open Patent Publication No. 2009-226665). After a user replaces the recording media stored in the medium storage portion with the recording media of a different size, there may be a case where the detection unit fails to detect the size of the recording media. In such a case, the user sets the size of the recording media using a setting screen of an operation panel or the like.

In this regard, there is a possibility that the user fails to correctly set the size of the recording media. In such a case, if the image forming apparatus executes a printing operation based on the incorrect size of the recording media set by the user, an operational problem (i.e., a size error) may occur, and it may become necessary for the user to perform a recovery operation.

SUMMARY OF THE INVENTION

An aspect of the present invention is intended to provide an image forming apparatus and an image forming system capable of preventing an operational problem even when a user fails to correctly set a size of a recording medium.

According to an aspect of the present invention, there is provided an image forming apparatus including a medium storing portion storing a recording medium, a storage unit that stores first size information indicating a size of the recording medium stored in the medium storage portion, and a receiving unit that receives print data from an external device. The print data contains image data and second size information indicating a size relating to the image data. The image forming apparatus further includes a feeding unit that feeds the recording medium from the medium storage portion, an image forming unit that forms an image on the recording medium fed by the feeding unit, a detection unit that detects a size of the recording medium fed by the feeding unit to obtain third size information, a first determining unit that determines whether the first size information stored in the storage unit corresponds to the second size information contained in the print data, a second determining unit that determines whether the third size information obtained by the detection unit corresponds to the second size information contained in the print data, an acquiring unit that acquires determination instruction information, and a determination control unit that causes the second determining unit to perform determination without causing the first determining unit to perform determination, according to the determination instruction information acquired by the acquiring unit.

With such a configuration, preventing an operational problem even when a user fails to correctly set a size of a recording medium.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIG. 8 shows a setting screen of an operation panel of the image forming apparatus according to Embodiment 1;

FIG. 9 shows a table showing respective medium size check modes and corresponding operations;

FIGS. 15A, 15B and 15C show examples of display contents displayed on a user interface;

DETAILED DESCRIPTION OF THE PREFERRED EMBODIMENT

Hereinafter, embodiments of the present invention will be described with reference to the attached drawings.

Embodiment 1

<Configuration of Embodiment 1>

Figure 1:
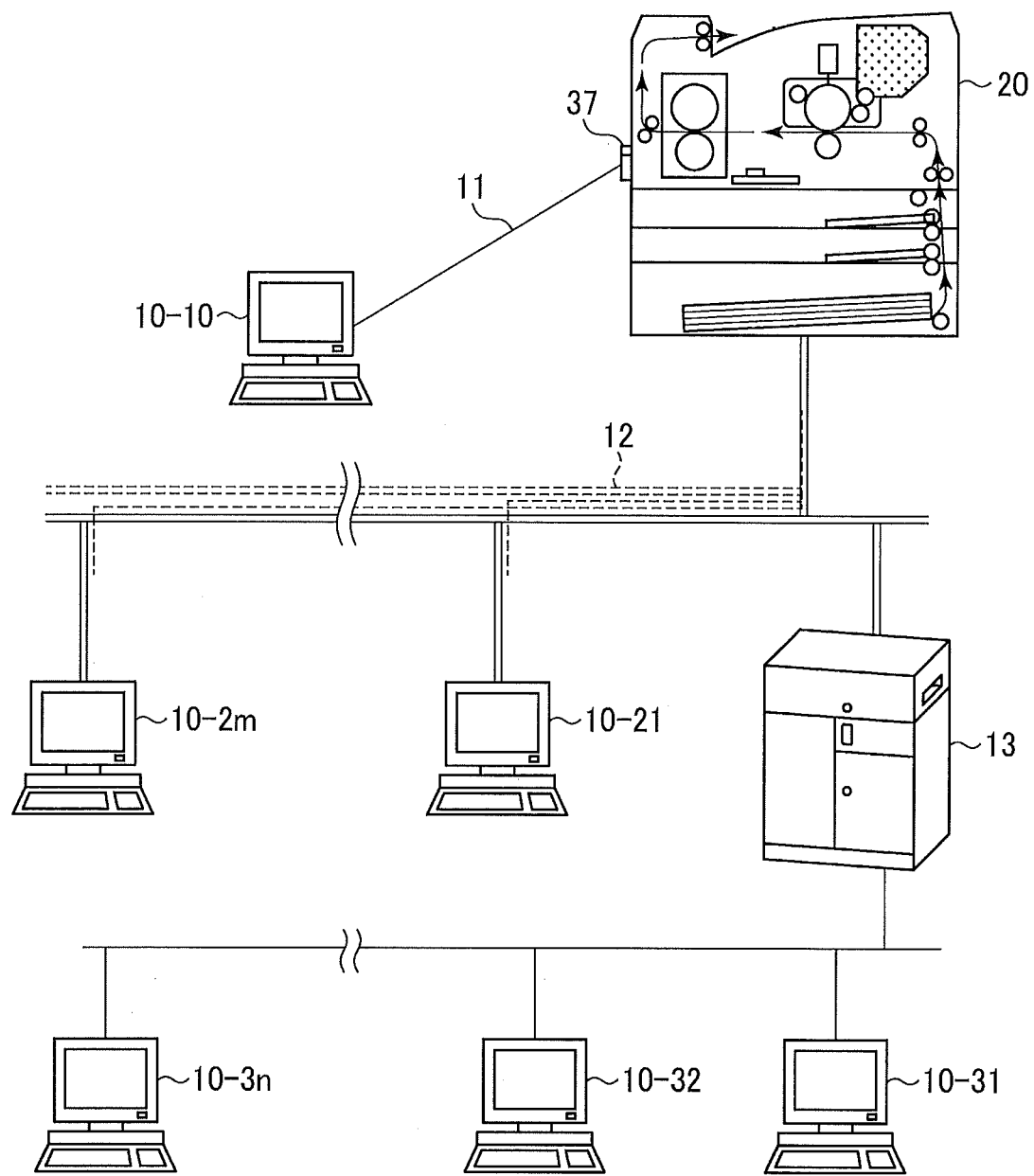
FIG. 1 is a schematic view showing an image forming system according to Embodiment 1 of the present invention.

FIG. 1 is a schematic view showing an image forming system according to Embodiment 1 of the present invention.

The image forming system of Embodiment 1 includes host devices (i.e., information processing apparatuses) 10 and an image forming apparatus 20. The host devices 10 are, for example, personal computers (PCs). The image forming apparatus 20 is, for example, a printer shared by the host devices 10. The host devices 10 and the image forming apparatus 20 are communicably connected to one another.

The image forming apparatus 20 is communicably connected to one of the host devices 10 (referred to as a host device 10-10) via a local port interface 11 such as a USB (Universal Serial Bus), a Centronics bidirectional serial/parallel converter, an RS-232C (Recommended Standard 232 Version C) or the like. Further, the image forming apparatus 20 is communicably connected to a plurality of the host devices 10-21 through 10-2m via a network interface 12. Further, the image forming apparatus 20 is communicably connected to a plurality of the host devices 10-31 through 10-3n via the network interface 12 and via a server 13 provided on the network interface 12.

Figure 2:
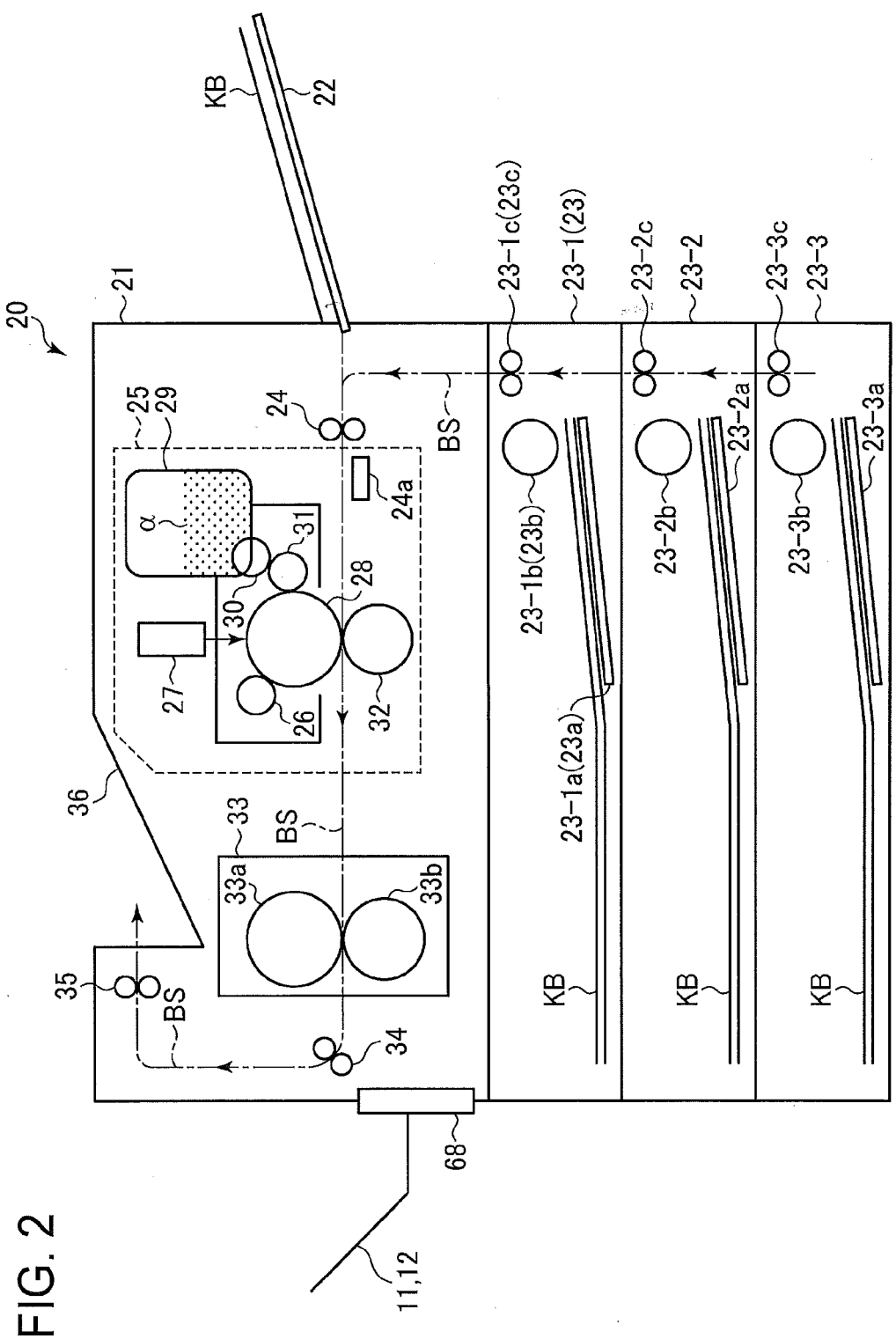
FIG. 2 is a schematic side view showing an image forming apparatus according to Embodiment 1.

FIG. 2 is a schematic side view showing a configuration of the image forming apparatus 20 shown in FIG. 1.

The image forming apparatus 20 has a housing 21. An image forming unit 25 and a fixing unit 33 are provided in the housing 21. A manual tray 22 and a tray 23-1 are mounted to the housing 21 as standard equipment. Trays 23-2 and 23-3 are mounted to the housing 21 as optional equipment. In a particular example, the trays 23 (23-1, 23-2 and 23-3) are provided below the image forming unit 25 and the fixing unit 33.

More specifically, the manual tray 22 is used to manually feed a recording medium KB (i.e., a printing sheet) to the medium feeding path BS, and is configured to store recording media KB. The trays 23-1, 23-2 and 23-3 (referred to as the trays 23) as medium storage portions are configured to store the recording media KB of the same size or different sizes. When one of the trays 23 (23-1, 23-2 and 23-3) is selected, the selected tray 23 feeds the recording media KB one by one to the medium feeding path BS shown by a dashed line. The trays 23 (23-1, 23-2 and 23-3) respectively include placing plates 23a (23-1a, 23-2a and 23-3a), hopping rollers 23b (23-1b, 23-2b and 23-3b), and delivery rollers 23c (23-1c, 23-2c and 23-3c). Further, a pair of feeding rollers 24 (i.e., a feeding unit) are provided downstream of the trays 23 along the medium feeding path BS. The feeding rollers 24 feed the recording medium KB (fed through the medium feeding path BS) to the image forming unit 25.

The image forming unit 25 includes a photosensitive drum 28, a charging roller 26, an LED (Light Emitting Diode) unit 27, a toner cartridge 29, a supplying roller 30, a developing roller 31 and a transfer roller 32.

The photosensitive drum 28 (i.e., an image bearing body) has a cylindrical shape and includes a photoconductive layer on a surface thereof. The charging roller 26 (i.e., a charging member) is configured to uniformly charge a surface of the photosensitive, drum 28. The LED unit 27 (i.e., an exposure unit) is configured to emit light to expose the surface of the photosensitive drum 28. An electrical charge is removed from an exposed part of the photosensitive drum 28, so that an electrostatic latent image is formed on the surface of the photosensitive drum 28. The toner cartridge 29 (i.e., a developer storage unit) is configured to store a toner α (i.e., a developer). The supplying roller 30 (i.e., a developer supplying member) is configured to supply the toner α to the developing roller 31. The developing roller 31 (i.e., a developer bearing body) is configured to develop the latent image on the photosensitive drum 28 using the toner α to form a toner image (i.e., a developer image). The transfer roller 32 (i.e., a transfer member) is configured to transfer the toner image from the photosensitive drum 28 to the recording medium KB fed by the feeding rollers 24.

A distance along a circumference of the photosensitive drum 28 from an exposure position (i.e., a position exposed with light emitted by the LED unit 27) to a contact position where the photosensitive drum 28 contacts the transfer roller 32 is expressed as L. A passage sensor 24a (i.e., a detection unit) is provided upstream of the contact portion between the photosensitive drum 28 and the transfer roller 32 in a direction in which the feeding rollers 24 feed the recording medium KB (i.e., a feeding direction). A distance between the passage sensor 24a and the contact portion corresponds to a sum of the distance L and an exposure-starting margin $\beta(=L+\beta)$. Based on a timing at which the passage sensor 24a detects a leading edge of the recording medium KB, an engine control unit (described later) causes the LED unit 27 to start light emission (i.e., formation of a latent image). Based on a timing at which the passage sensor 24a detects a trailing edge of the recording medium KB, the engine control unit 60 causes the LED unit 27 to stop light emission. Further, a control unit 52 (described later) determines a length of the recording medium KB based on a time interval after the passage sensor 24a detects the leading edge of the recording medium KB and before the passage sensor 24a detects the trailing edge of the recording medium KB, and based on a speed (i.e., a feeding speed) at which the feeding rollers 24 feed the recording medium KB.

The fixing unit 33 is provided downstream of the image forming unit 25 in the feeding direction of the recording medium KB. The fixing unit 33 includes a heat roller 33a and a backup roller 33b that apply heat and pressure to the recording medium KB to which the toner image has been transferred. The heat roller 33a and the backup roller 33b fix the toner image to the recording medium KB by application of heat and pressure.

Ejection rollers 34 and 35 are provided downstream of the fixing unit 33 in the feeding direction of the recording medium KB. The ejection rollers 34 and 35 feed the recording medium KB (to which the toner image has been fixed) and eject the recording medium KB to a stacker 36 (i.e., an ejection unit). An interface connector 68 is provided at a backside (i.e., a left side in FIG. 2) of the image forming apparatus 20. The interface connector 68 is connected to the local port interface 11 and the network interface 12 for communication with the host devices 10 shown in FIG. 1.

In FIG. 2, the recording medium KB is fed along the medium feeding path BS (shown by the dashed line) through the delivery rollers 23c, the feeding rollers 24, the ejection rollers 34 and the ejection rollers 35 in this order, and is ejected to the stacker 36.

Figure 3:
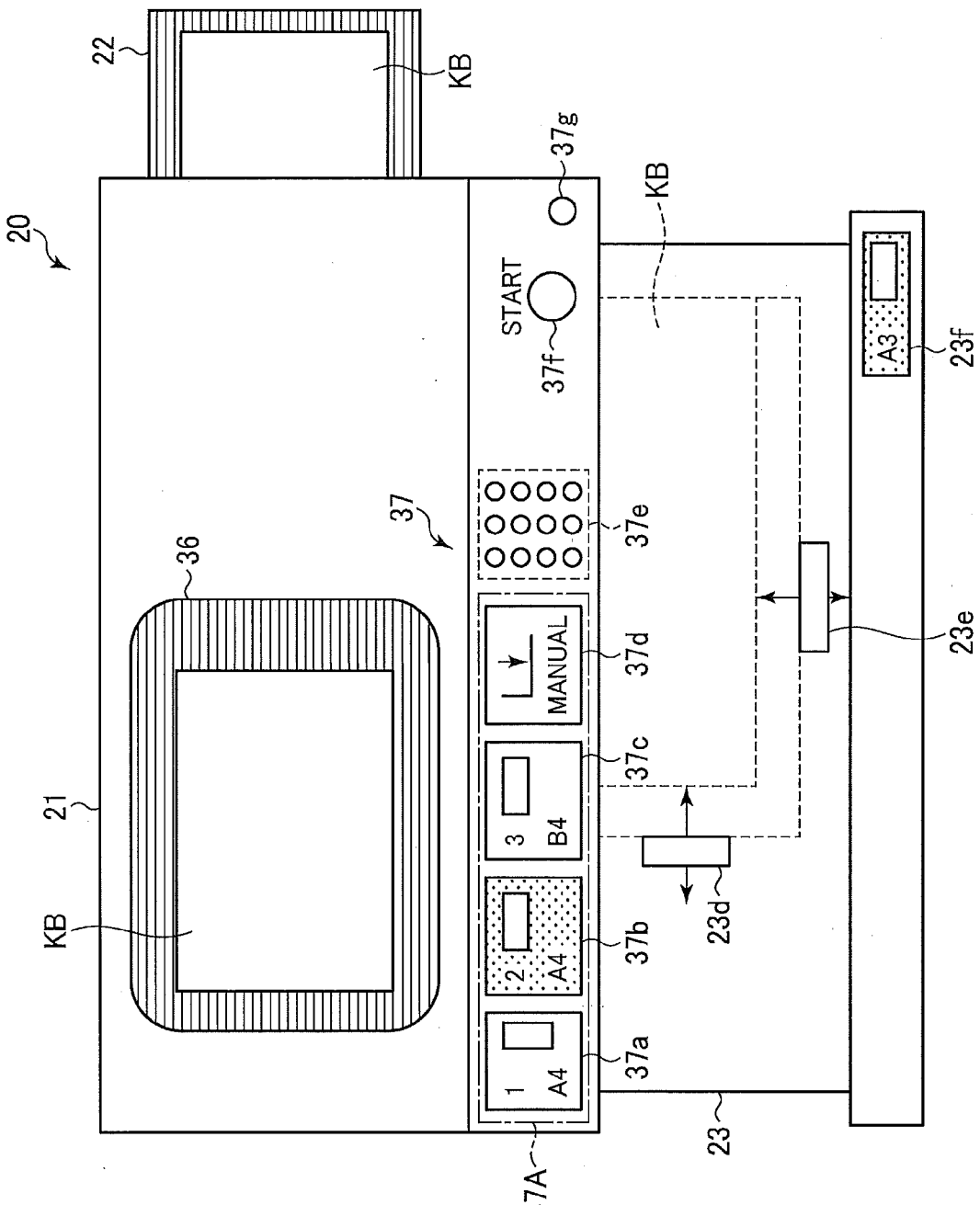
FIG. 3 is a schematic plan view showing the image forming apparatus according to Embodiment 1 in a state where a tray is pulled out therefrom.

FIG. 3 is a schematic plan view of the image forming apparatus 20 in a state where the tray 23 is pulled out from the image forming apparatus 20.

In FIG. 3, one of the trays 23 is pulled out from the image forming apparatus 20 in order to replenish the recording medium KB or to replace the recording medium KB with those of a different size. Each tray. 23 has a first guide plate 23d and a second guide plate 23e that define a position of the recording media KB in the tray 23. The first guide plate 23d is movable in a horizontal direction (i.e., left-right direction) in FIG. 3, and the second guide plate 23e is movable in a vertical direction in FIG. 3 to allow a user to change the size of the recording media KB stored in the tray 23. Further, each tray 23 has a size setting dial 23f for setting the size of the recording medium KB. The size setting dial 23f has an indication of a size which can be seen from the front.

An operation panel 37 is provided on a front side of an upper surface of the image forming apparatus 20. The operation panel 37 includes a touch panel 37A (for example, an LCD touch panel), a ten-key section 37e, a start button 37f and a replacement finish button 37g. The touch panel 37A, the ten-key section 37e, the start button 37f and the replacement finish button 37g are arranged in this order from the left to the right in FIG. 3. The touch panel 37A includes a selection button 37a for the tray 23-1, a selection button 37b for the tray 23-2, a selection button 37c for the tray 23-3, and a selection button 37d for the manual tray 22.

The selection button 37a indicates a size (for example, A4 vertical size) of the recording media KB stored in the tray 23-1. The selection button 37a is pressed to select the recording media KB stored in the tray 23-1 (i.e., to select the tray 23-1). The selection button 37b indicates a size (for example, A4l horizontal size) of the recording media KB stored in the tray 23-2. The selection button 37b is pressed to select the recording media KB stored in the tray 23-2 (i.e., to select the tray 23-2). The selection button 37c indicates a size (for example, B4 horizontal size) of the recording media KB stored in the tray 23-3. The selection button 37c is pressed to select the recording media KB stored in the tray 23-3 (i.e., to select the tray 23-3). The selection button 37d indicates a size of the recording media KB stored in the manual tray 22. The selection button 37d is pressed to select the recording media KB stored in the manual tray 22 (i.e., to select the manual tray 22). The ten-key section 37e includes buttons for inputting the number of printings (i.e., the number of recording media) or the like. The start button 37f is pressed when the user completes the settings and starts operation.

For example, when the user is going to set the recording media of A4 horizontal size to the tray 23-2 having been set to A4 horizontal size, the user pulls the tray 23-2 and then sets the recording media of A4 horizontal size to the tray 23-2. In this case, since the indications of the selection button 37b and the size setting dial 23f indicate A4 horizontal size, it is not necessary to operate the selection button 37b and the size setting dial 23f.

In contrast, for example, when the user is going to set the recording media of A3 horizontal size to the tray 23-2 having been set to A4 horizontal size, the user pulls the tray 23-2, moves the first and second guide plates 23d and 23e to positions according to A3 horizontal size, and then sets the recording media of A3 horizontal size to the tray 23-2. Then, the user touches the selection button 37b to set the indication of the selection button 37b to A3 horizontal size, and also sets (for example, rotates) the size setting dial 23f to A3 horizontal size.

The replacement finish button 37g is pressed after the user completes replacement of the recording media KB stored in any of the trays 23 and pushes the tray 23 into the image forming apparatus 20.

Figure 4:
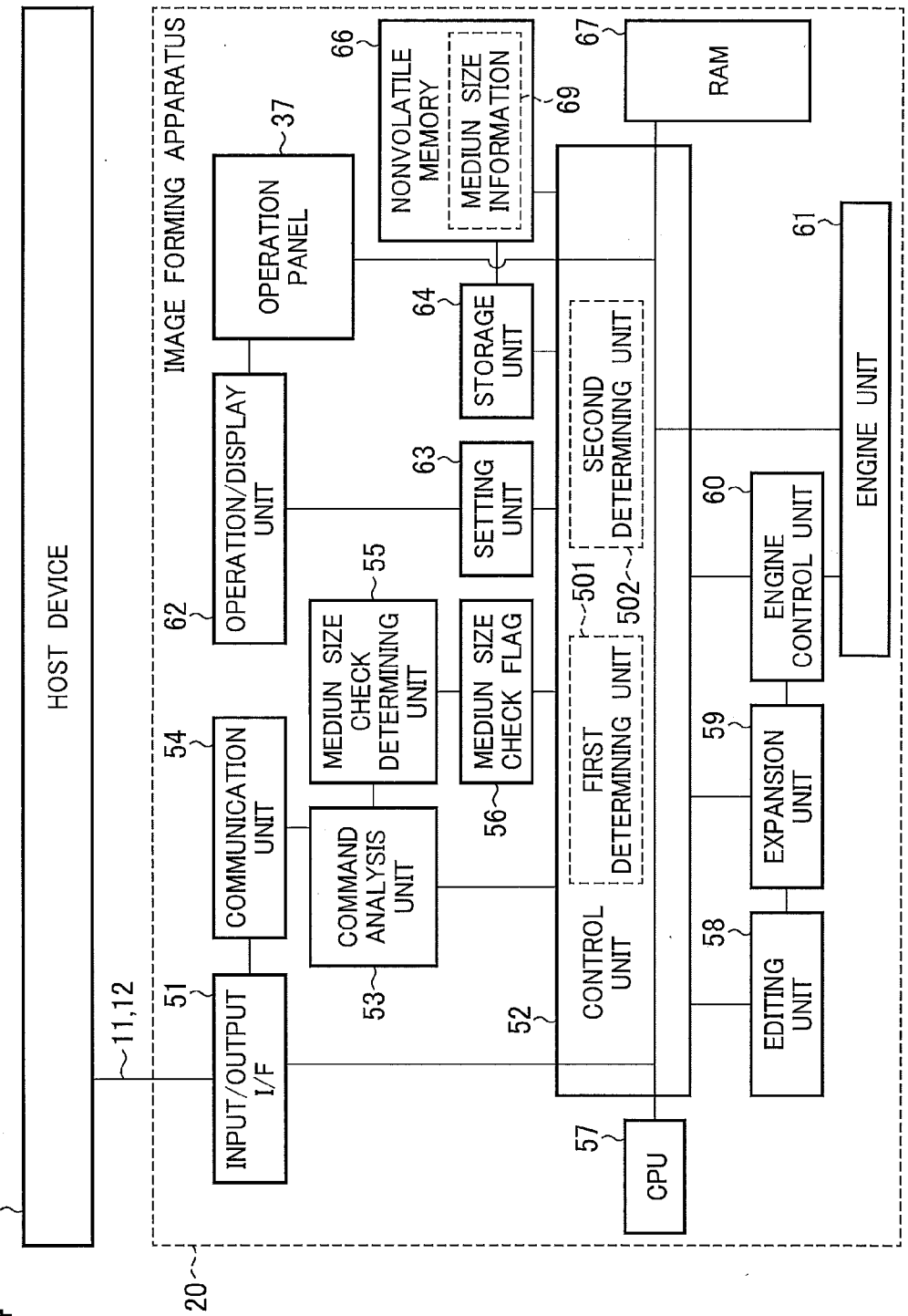
FIG. 4 is a block diagram showing a configuration of the image forming apparatus according to Embodiment 1.

FIG. 4 is a block diagram showing a configuration of the image forming apparatus 20 shown in FIG. 1. The image forming apparatus shown in FIG. 4 is communicably connected to the host devices 10.

The image forming apparatus 20 includes an input/output interface 51. The input/output interface 51 processes data on all communication interfaces including unidirectional and bidirectional interfaces. The input/output interface 51 is connected to a control unit 52. The control unit 52 controls an entire operation of the image forming apparatus 20.

The control unit 52 (i.e., a determination control unit) communicates with the host devices 10, the engine control unit 60, an engine unit, 61 and the like. The control unit 52 manages all interfaces provided inside and outside the image forming apparatus 20. The control unit 52 includes a first determining unit 501 and a second determining unit 502 as described later. The control unit 52 is connected to a command analysis unit 53.

The engine unit 61 includes the hopping rollers 23b, the delivery rollers 23c, the feeding rollers 24, the passage sensor 24a, the image forming unit 25, the fixing unit 33 and the ejection rollers 34 and 35 shown in FIG. 2. That is, the engine unit 61 feeds the recording medium KB and forms an image on the recording medium KB.

The command analysis unit 53 (i.e., an acquiring unit) analyzes data (i.e., print job data JD) transmitted from the host device 10, and acquires information regarding processing to check the size of the recording medium KB (referred to as a medium size check mode). Data indicating the medium size check mode (contained in the print job data JD) is referred to as medium size check mode data JD1. The command analysis unit 53 is connected to a communication unit 54 and a medium size check determining unit 55.

The communication unit 54 (i.e., a receiving unit) is connected to the input/output interface 51. The communication unit 54 receives print job data JB or inquiry command transmitted from the host device 10 to the image forming apparatus 20. Further, as necessary, the communication unit 54 transmits response to the host device 10, and manages record of bidirectional communication.

The medium size check determining unit 55 takes out the medium size check mode data JD1 from the command analysis unit 53, and determines whether the medium size check mode data JD1 is 3 (described later) or not. The medium size check determining unit 55 sets a medium size check flag 56 based on a result of determination by the medium size check determining unit 55.

The medium size check flag 56 is set when the medium size check mode data JD1 is 3. The medium size check flag 56 is shared information. The image forming apparatus 20 refers to the medium size check flag 56 to recognize the medium size check mode data JD1.

A CPU (Central Processing Unit) 57 is hardware for operating the image forming apparatus 20. The CPU 57 is connected to the control unit 52.

An editing unit 58 analyzes the print job data JD to obtain information in each page, and creates print image data in a page descriptor format. The editing unit 58 is connected to the control unit 52 and an expansion unit 59. The expansion unit 59 analyzes the print image data created by the editing unit 58, creates bitmap data pattern, and outputs the bitmap data pattern to the engine unit 61. The expansion unit 59 also manages the bitmap data pattern to be outputted.

The engine control unit 60 is connected to the control unit 52 and the engine unit 61. The engine control unit 60 transmits data such as print job data and setting data (analyzed by the control unit 52 and the expansion unit 59) to the engine unit 61 for a printing operation. The engine control unit 60 monitors conditions of the recording media KB stored in the trays 23-1, 23-2 and 23-3 and the manual tray 22. More specifically, the engine control unit 60 monitors information of the recording medium KB, absence of the recording medium KB, change in size of the recording media KB (when the recording media KB are replenished or replaced), occurrence of jam error or the like in the trays 23-1, 23-2 and 23-3 and the manual tray 22. The engine control unit 60 transmits monitoring information to the control unit 52. The engine unit 61 executes a printing operation (i.e., an image forming operation) under control of the engine control unit 60.

An operation/display unit 62 transmits information of settings (set by the operation panel 37) to the control unit 52 via a setting unit 63. The operation/display unit 62 causes the touch panel 37A of the operation panel 37 to display a condition of or instruction from the image forming apparatus 20 to notify (inform) the user of the condition or instruction.

A setting unit 63 sets parameters regarding the operation of the image forming apparatus 20. The parameters are set by selectively turning on/off respective functions using a menu screen or the like. The setting unit 63 transmits the parameters to a storage unit 64. The storage unit 64 stores the parameters (transmitted from the setting unit 63) in a nonvolatile memory 66. The parameters set by the setting unit are stored in a RAM (Random Access Memory) 67 and the nonvolatile memory 66 via the storage unit 64.

The operation panel 37 constitutes a user interface. The operation panel 37 transmits a command (set by the touch panel 37A) to the image forming apparatus 20, and causes the touch panel 37A (FIG. 3) to display the condition of the image farming apparatus 20. The touch panel 37A include the selection button 37a for the tray 23-1, the selection button 37b for the tray 23-2, the selection button 37c for the tray 23-3, the selection button 37d for the manual tray 22, the ten-key section 37e and the start button 37f as described above. The touch panel 37A is, for example, an LCD (Liquid Crystal Display) of a dot matrix type.

The nonvolatile memory 66 (i.e., a storage unit) and the RAM 67 manage stored information (for example, data to be registered, set values, counter values, information on conditions, log information or the like). More specifically, the nonvolatile memory 66 and the RAM 67 determine layouts of the stored information, and manage reading and writing of the information. The nonvolatile memory 66 has a memory space that holds data (for example, set values) even when a power is turned off of.

The nonvolatile memory 66 holds information (referred to as medium size information 69) of the sizes of the recording media KB stored in the trays 23-1, 23-2 and 23-3 and the manual tray 22. The medium size information 69 (i.e., first size information) is based on the setting by the user via the touch panel 37A or the size setting dial 23f of the trays 23. The nonvolatile memory 66 is, for example, a hard disk drive, a flash memory, an SD (Secure Digital) memory, an EEPROM (Electrically Erasable Programmable Read-Only Memory).

The nonvolatile memory 66 and the RAM 67 also store settings (i.e., menu information) regarding the medium size check modes. The RAM 67 has a memory space used for various operations in the image forming apparatus 20. Information stored in the RAM 67 is erased when the power is turned off.

Figure 5:
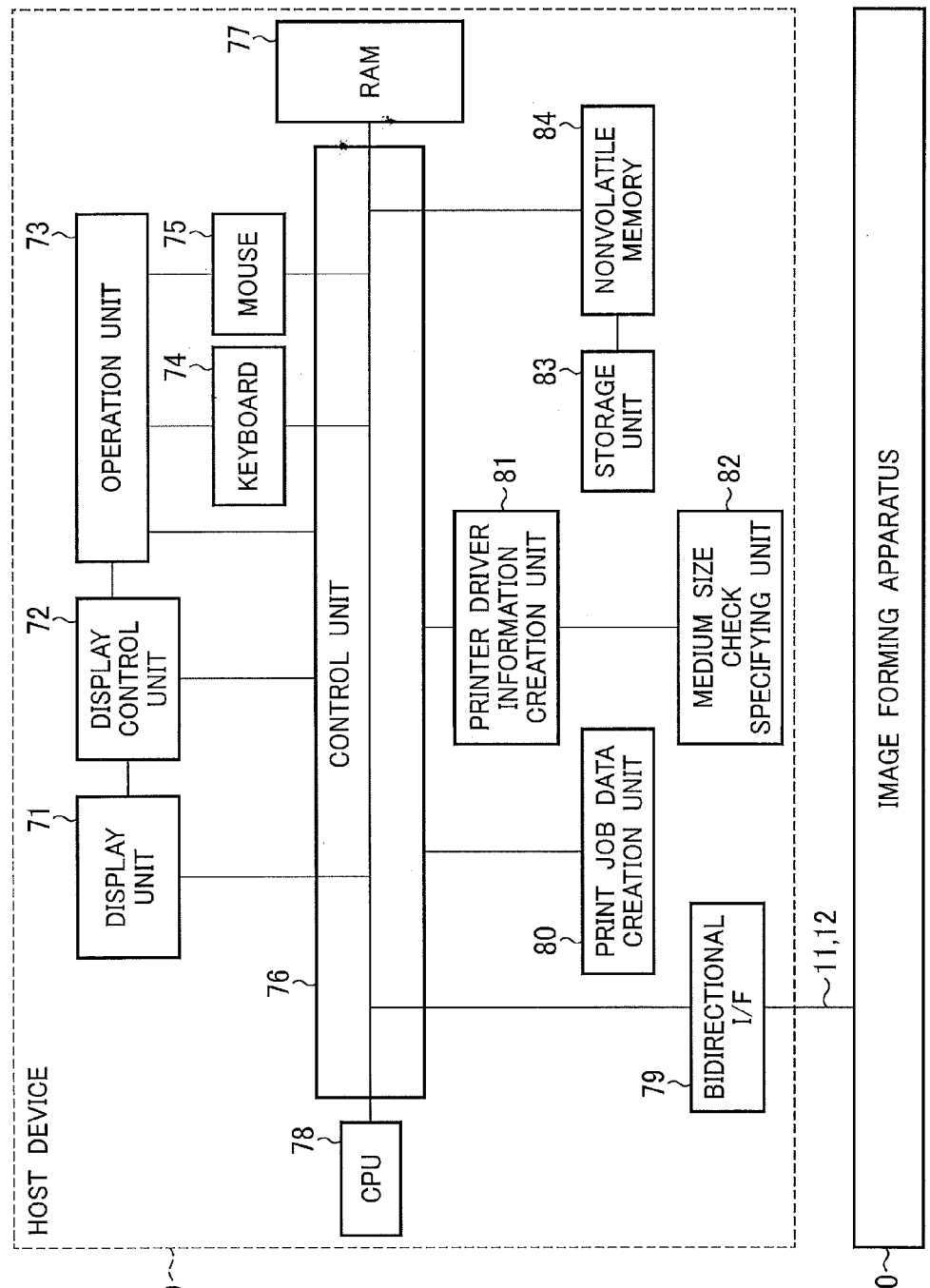
FIG. 5 is a block diagram showing a configuration of a host device according to Embodiment 1.

FIG. 5 is a block diagram showing a configuration of the host device 10 (i.e., an external device) shown in FIG. 2. The configuration shown in FIG. 5 is common to the host devices 10-10, 10-21 through 10-2m, and 10-31 through 10-3m.

The host device 10 is communicably connected to the image forming apparatus 20. The host device 10 functions as an information processing apparatus with respect to the image forming apparatus 20. The host device 10 is constituted by a personal computer or the like. The host device 10 has software such as a printer driver or utilities. Using the host device 10, the user creates print job data JD, and transmits the created print job data JD. Further, using the host device 10, the user changes settings of the image forming apparatus 20. Furthermore, using the host device 10, the user monitors and manages the image forming apparatus 20 via bidirectional communication (i.e., by transmitting inquiry command to the image forming apparatus 20).

The host device 10 includes a display unit 71, a display control unit 72, an operation unit 73, a keyboard 74, a mouse 75, a control unit 76, a RAM 77, a CPU 78, a bidirectional interface 79, a print job data creation unit 80, a printer driver information creation unit 81, a medium size check specifying unit 82, a medium size check specifying unit 82, a storage unit 83, and a nonvolatile memory 84.

The display unit 71 displays an image indicating a condition of the image forming system to notify the user of the condition of the image forming system, and to prompt the user to input instruction. The display unit 71 is a hardware user interface. The display unit 71 is connected to the display control unit 72 and the control unit 76. The display control unit 72 controls the display unit 71, and is connected to the operation unit 73 and the control unit 76.

The operation unit 73 transmits information (i.e., hardware signal) inputted using the keyboard 74 or the mouse 75 to the control unit 76. That is, the operation unit 73 functions as a user interface of the host device 10. The keyboard 74 is a hardware input device having touch keys. The mouse 75 is a hardware input device having a click button.

The control unit 76 (i.e., a specifying unit) controls an entire operation of the host device 10. The RAM 77 has a hardware memory space (i.e., a working area) used for various operations in the host device 10.

The bidirectional interface 79 enables communication between the host device 10 and the image forming apparatus 20. The bidirectional interface 79 is connected to the control unit 76 and the print job data creation unit 80.

The print job data creation unit 80 (i.e., a creation unit) creates the print job data JD to be transmitted to the image forming apparatus 20. More specifically, the print job data creation unit 80 creates the print job data JD by adding information to image data. The added information to the image data includes information indicating the medium size check mode (i.e., the medium size check mode data JD1) and information indicating a size of the image data (i.e., drawing image size JD2 described later).

The printer driver information creation unit 81 creates data to add command information to the print job data JD in accordance with settings by a setting screen. The command information is added to the print job data JD. The printer driver information creation unit 81 is connected to the medium size check specifying unit 82. The medium size check specifying unit 82 specifies how to execute medium size check.

The storage unit 83 executes processing to store data in the nonvolatile memory 84 of the host device 10. The nonvolatile memory 84 has a hardware space that holds data even when the poser is turned off. The nonvolatile memory 84 is, for example, a hard disk drive, a flash memory or the like.

Figure 6:
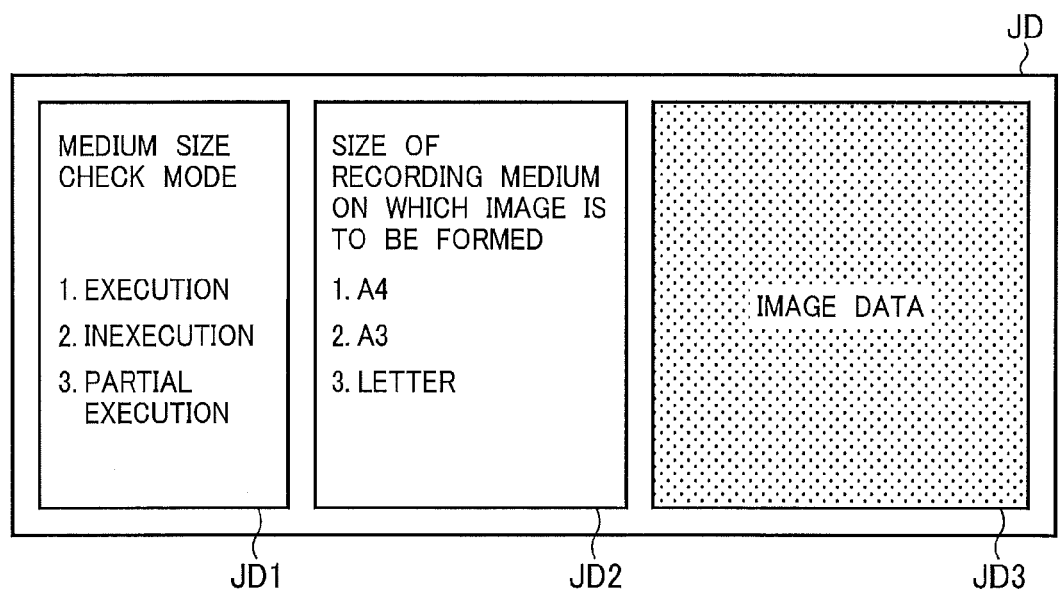
FIG. 6 is a schematic view showing a print job data according to Embodiment 1.

FIG. 6 is a schematic view showing an example of the print job data JD according to Embodiment 1.

The print job data JD shown in FIG. 6 is created by the print job data creation unit 80 of the host device 10 (FIG. 5), and is transmitted to the image forming apparatus 20. The print job data JD includes image data JD3, information JD1 indicating the selected medium size check mode (i.e., the medium size check mode data JD1) and information JD2 indicating a size of a recording medium on which an image is to be formed according to the print job data JD.

For example, when the medium size check mode data JD1 is 1, it means full execution of the medium size check (i.e., to fully execute the medium size check). When the medium size check mode data JD1 is 2, it means inexecution of the medium size check (i.e., not to execute the medium size check). When the medium size check mode data JD1 is 3, it means partial execution of the medium size check (i.e., to partially execute the medium size check).

The information JD2 (i.e., second size information) is, for example, a size of the recording medium KB (on which an image is to be formed according to the print job data JD) specified by the user via the setting screen (FIG. 7) or the like. The information JD2 can also be a size of an image which is to be formed based on the print job data. Hereinafter, the information JD2 is referred to as a drawing image size JD2. The drawing image size JD2 is, for example, A4 size, A3 size, or postcard size.

When the image forming apparatus 20 receives the print job data JD as shown in FIG. 6, the command analysis unit 53 (FIG. 4) analyzes the print job data JD to obtain the medium size check mode data JD1. Based on the medium size check mode data JD1, the medium size check is executed.

Figure 7:
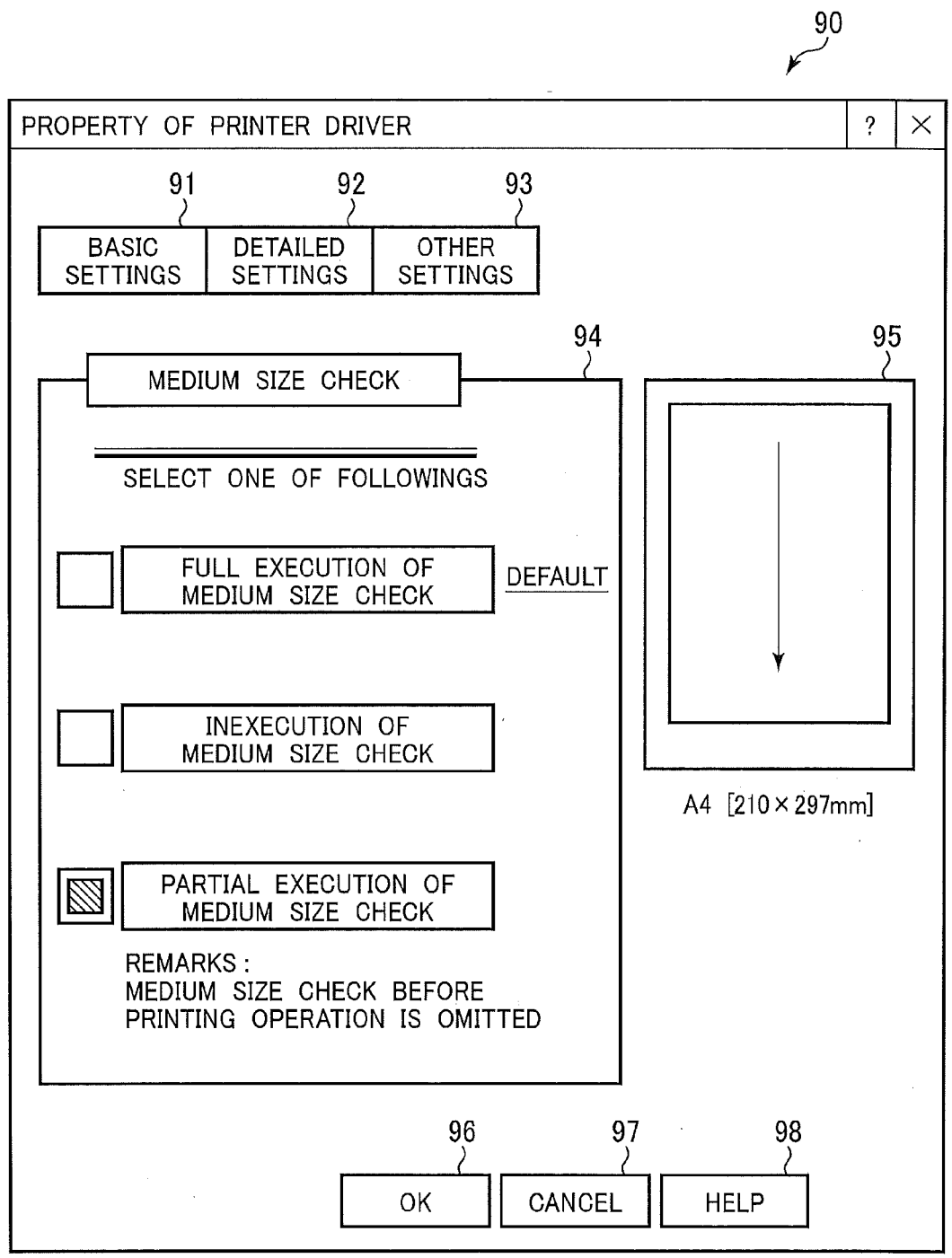
FIG. 7 is a schematic view showing an example of a setting screen of a printer driver according to Embodiment 1.

FIG. 7 is a schematic view showing a setting screen provided by the printer driver according to Embodiment 1.

A selection menu is displayed in an upper area of the setting screen. The selection menu includes three selections: basic settings 91, detailed settings 92, and other settings 93. In an example shown in FIG. 7, the detailed settings 92 are selected. An underline is displayed below an indication (text) of the detailed settings 92.

In the case where the detailed settings 92 are selected, a medium size check mode setting area 94 is displayed in a center part of the setting screen. The medium size check mode setting area 94 is used to select the mode of the medium size check. The medium size check mode setting area 94 includes three selections: full execution of the medium size check (i.e., to execute the medium size check), inexecution of the medium size check (i.e., not to execute the medium size check), and partial execution of the medium size check (i.e., to partially execute the medium size check). Check boxes are provided on left sides of the respective menu items. In the example shown in FIG. 7, the partial execution of the medium size check is selected. Further, a medium specifying area 95 is provided on a right side of the medium size check mode setting area 94. The medium specifying area 95 is used to specify a medium size (i.e., a sheet size). In the example shown in FIG. 7, the A4 vertical size is specified by the medium specifying area 95.

An OK button 96, a cancel button 97 and a help button 98 are provided below the medium size check mode setting area 94. The OK button 96 is pressed to determine settings and to proceed to a next setting screen. The cancel button 97 is pressed to cancel the settings. The help button 98 is pressed to display a help window showing instructions. The medium size check mode is set to the "full execution of the medium size check" by default. However, default setting can be changed according to a user's application or request.

If a dedicated printer driver is used, the selected medium size check mode data JD1 is added to the print job data JD as command information. Therefore, each print job data JD contains a corresponding medium size check mode data JD1. Based on the medium size check mode data JD1 contained in the print job data JD, the image forming apparatus 20 executes the medium size check according to instruction from the host device 10.

FIG. 8 is a schematic view showing an example of a setting screen shown on the operation panel 37 (FIG. 4) of the image forming apparatus 20. In FIG. 8, menu items of the setting screen of the operation panel 37 include selections of the medium size check mode.

The setting screen shown in FIG. 8 includes categories 101, function items 102, selections 103 and default settings 104. In the category of a print setting, the function items 102 include the number of copies, double-side printing, and the medium size check mode. The number of copies is selectable from 1 to 999, and is set to 1 by default. The double-side printing is selectable between "ON" and "OFF", and is set to "OFF" by default. The medium size check mode is selectable from "full execution of the medium size check", "inexecution of the medium size check", and "partial execution of the medium size check". The medium size check mode is set to the "full execution of the medium size check" by default.

If the dedicated printer driver is used, each print job data JD contains the medium size check mode data JD1 (as the command information) selected by the setting screen shown in FIG. 7 as described above. In such a case, the medium size check mode set by the setting screen (FIG. 8) of the operation panel 37 of the image forming apparatus 20 is not employed. In contrast, if a non-dedicated printer driver (having no function to add the medium size check mode to the print job data JD) is used, the medium size check mode selected by the setting screen (FIG. 8) on the operation panel 37 of the image forming apparatus 20 is employed.

FIG. 9 is a schematic view showing the medium size check modes and operations corresponding to the respective medium size check modes according to Embodiment 1.

The table shown in FIG. 9 has a column 111 including the medium size check modes, i.e., [1] full execution of the medium size check, [2] inexecution of the medium size check, and [3] partial execution of the medium size check.

The medium size check can be executed before the printing operation and/or during the printing operation (i.e., while the recording medium KB is being fed).

A column 112 includes sub-columns 112-1 and 112-2 respectively corresponding to the medium size check before the printing operation and the medium size check during the printing operation. In each of the sub-columns 112-1 and 112-2, whether or not to execute the medium size check is determined in accordance with the medium size check modes.

In this regard, the medium size check can be executed before the printing operation by comparing the drawing image size JD2 contained in the print job data JD and the size of the recording medium KB (i.e., stored in the selected tray 23) recognized by the image forming apparatus 20 (i.e., the control unit 52). This medium size check is executed by the first determining unit 501 (FIG. 4) of the control unit 52. In this case, the medium size check is executed before the engine control unit 60 starts the image formation. In this regard, the image forming apparatus 20 can have a medium size detection unit that automatically detects the sizes of the recording medium KB stored in the respective trays 23. Alternatively, the image forming apparatus 20 can recognize the size of the recording medium KB according to user's selection via the menu (i.e., the touch panel 37A) and the size setting dial 23f. In this embodiment, the image forming apparatus 20 has the menu (i.e., the touch panel 37A) and the size setting dial 23f with which the user inputs the size of the recording medium KB.

In contrast, the medium size check can be executed during the printing operation by comparing the drawing image size JD2 contained in the print jot data JD and the size of the recording medium KB (fed by the feeding rollers 24) recognized by the image forming apparatus 20. This medium size check is executed by the second determining unit 502 (FIG. 4) of the control unit 52. The image forming apparatus 20 recognizes the size of the recording medium KB based on timings at which the passage sensor 24a detects the leading edge and the trailing edge of the recording medium KB. Information indicating the size of the recording medium KB detected using the passage sensor 24a is referred to as third size information. In this regard, when a failure in feeding of the recording medium KB (for example, skew, jam or duplicate feeding) occurs in the engine unit 61, a size error may be determined to have occurred even if the recording medium KB of a correct size is stored in the selected tray 23.

When the medium size check mode "1" (i.e., a first mode) is selected, the comparison between the drawing image size JD2 and the medium size of the recording medium KB recognized by the image forming apparatus 20 is executed before the printing operation and during the printing operation. In this case, both of the first determining unit 501 and the second determining unit 502 of the control unit 52 execute medium size check.

When the medium size check mode "2" (i.e., a second mode) is selected, the comparison between the drawing image size JD2 and the medium size of the recording medium KB recognized by the image forming apparatus 20 is not executed before the printing operation or during the printing operation. In this case, neither the first determining unit 501 nor the second determining unit 502 of the control unit 52 executes medium size check.

When the medium size check mode "3" (i.e., a third mode) is selected, the comparison between the drawing image size JD2 and the medium size of the recording medium KB recognized by the image forming apparatus 20 is executed only during the printing operation. In this case, the first determining unit 501 of the control unit 52 does not execute medium size check, but the second determining unit 502 of the control unit 52 executes medium size check.

The control unit 52 (as the determination control unit) determines which of the first determining unit 501 and the second determining unit 502 execute medium size check, according to the medium size check mode (i.e., determination instruction).

Compared with the medium size check modes 1 and 2, the medium size check mode "3" provides the following merits.

When the medium size check mode "1" is selected, if the user fails to correctly set the medium size via the menu (i.e., the touch panel 37A) or the size setting dial 23f after replacing the recording medium KB stored in the tray 23 with those of different size, the first determining unit 501 may determine that a size error occurs. In such a case, the printing operation is not executed even if the recording media KB of a correct size are stored in the tray 23. In contrast, when the medium size check mode "3" is selected, the printing operation is executed (as long as the size of the recording medium KB detected using the passage sensor 24a is the same as the drawing image size JD2) even when the user fails to correctly set the medium size after changing the recording media KB stored in the tray 23.

When the medium size check mode "2" is selected, the medium size check is executed neither before the printing operation nor during the printing operation, and therefore operational problem may occur. For example, if the printing operation is executed using the recording medium KB whose size is smaller than the drawing image size JD2 contained in the print image data JD, leakage of the toner may occur in the image forming apparatus 20. In such a case, components of the image forming apparatus 20 may have to be cleaned. Therefore, operation of the image forming apparatus 20 may become inefficient, and a lifetime of the image forming apparatus 20 may be shortened. In contrast, when the medium size check mode "3" is selected, the medium size check is executed during the printing operation (more specifically, while the recording medium KB is being fed), the operational problem can be prevented. That is, the leakage of the toner in the image forming apparatus 20 can be prevented, and the lifetime of the image forming apparatus 20 can be lengthened.

<Operation of Embodiment 1>

Figure 10:
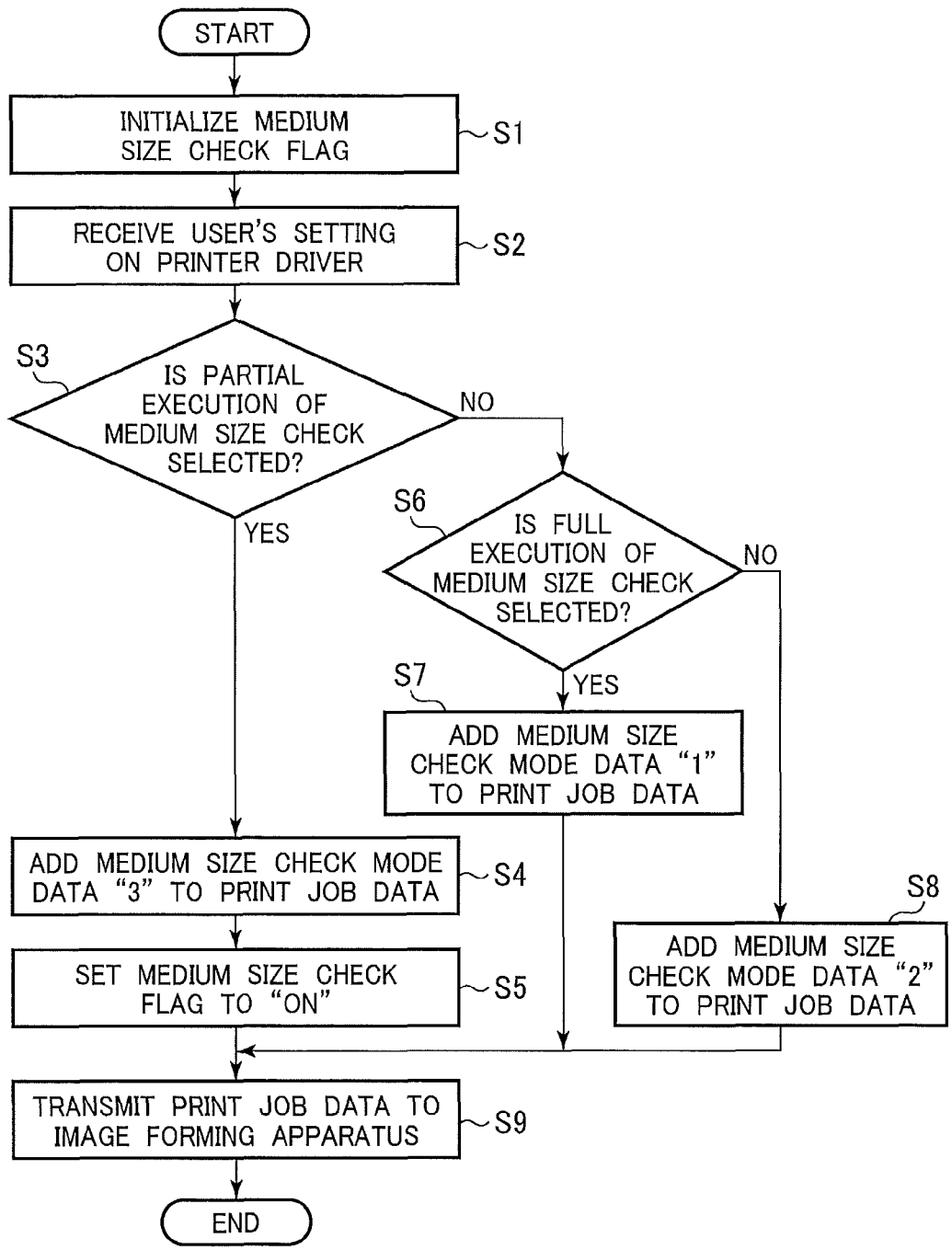
FIG. 10 is a flowchart showing processing executed by the host device shown in FIG. 5.

FIG. 10 is a flowchart showing processing executed by the host device 10 shown in FIG. 5.

The processing executed by the host device 10 will be described with reference to FIGS. 5 and 10.

When the processing of the host device 10 starts, the control unit 76 initializes a medium size check flag (step S1). The medium size check flag 56 indicates whether the partial execution of the medium size check is selected or not. The medium size check flag is shared information, and is read by the image forming apparatus 20.

Then, the control unit 76 causes the display unit 71 to display the setting screen (FIG. 7) and allows the user to select the settings of the printer driver using the setting screen (step S2). Then, the control unit 76 checks the medium size check mode selected via the setting screen (FIG. 7), and determines whether the partial execution of the medium size check (i.e., the medium size check mode "3") is selected or not (step S3). If the partial execution of the medium size check is selected (YES in step S3), the control unit 76 proceeds to step S4. If the partial execution of the medium size check is not selected (NO in step S2), the control unit 76 proceeds to step S6.

In step S4, the control unit 76 adds the medium size check mode data JD1 of "3" to the print job data JD. Then, the control unit 76 sets the medium size check flag 56 "ON" (step S5), and proceeds to step S9.

In step S6, the control unit 76 determines whether the full execution of the medium size check (i.e., the medium size check mode "1") is selected or not. If the full execution of the medium size check is selected (YES in step S6), the control unit 76 adds the medium size check mode data JD1 of "1" to the print job data JD (step S7), and proceeds to step S9. If the full execution of the medium size check is not selected (NO in step S6), the control unit 76 adds the medium size check mode data JD1 of "2" to the print job data JD (step S8), and proceeds to step S9.

In step S9, the control unit 76 transmits the print, job data JD to the image forming apparatus 20. Then, the control unit 76 ends the processing.

Figure 11A:
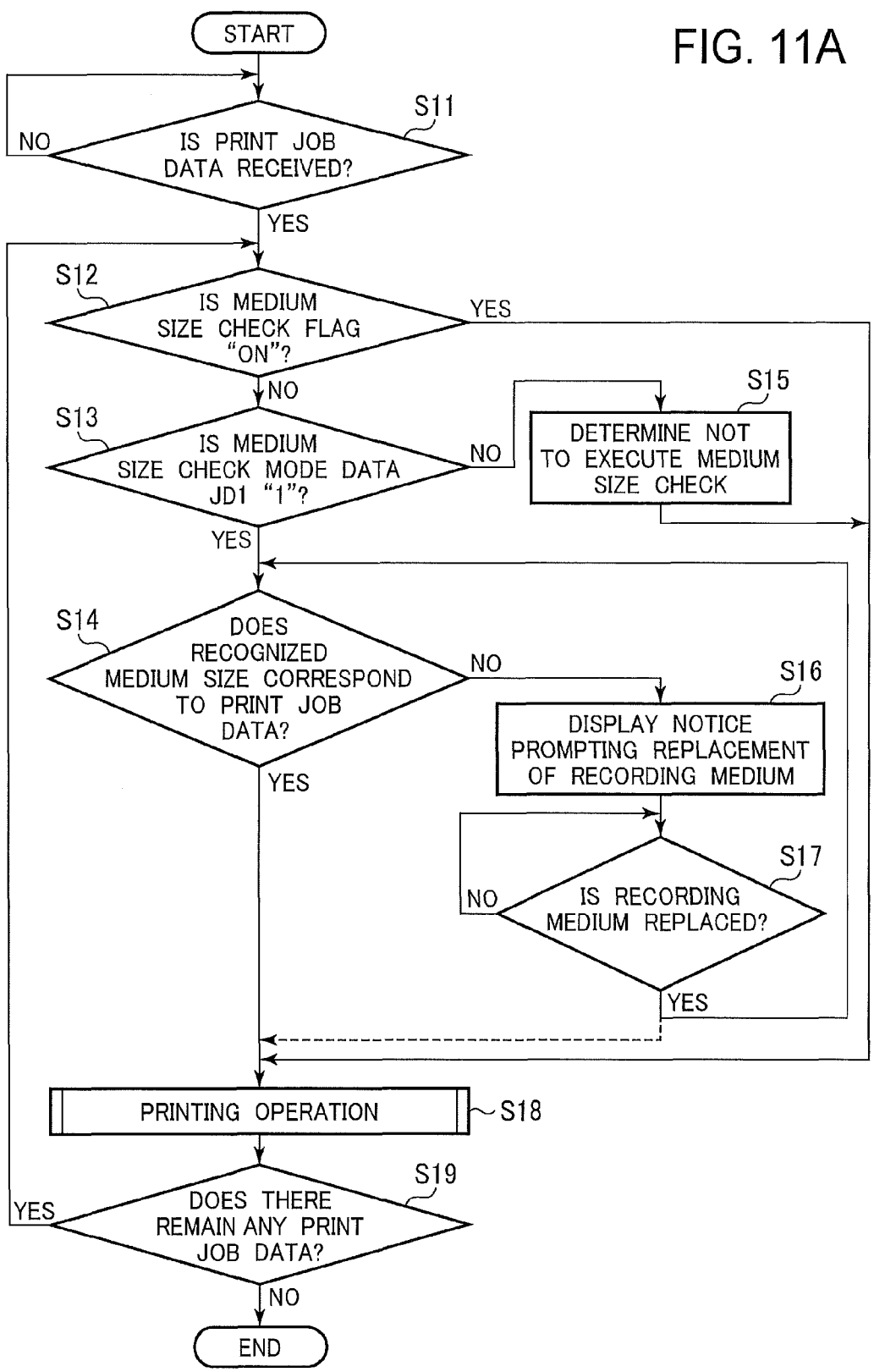
FIG. 11A is a flowchart showing processing executed by the image forming apparatus shown in FIG. 4.

FIG. 11A is a flowchart showing processing executed by the image forming apparatus 20 (FIG. 4).

The processing executed by the image forming apparatus 20 will be described with reference to FIGS. 4 and 11.

When the processing of the image forming apparatus 20 starts, the control unit 52 checks whether the control unit 52 receives the print job data JD transmitted from the host device 10 via the communication unit 54 and the command analysis unit (step S11). If the control unit 52 receives the print job data JD, the control unit 52 proceeds to step S12.

In step S12, the control unit 52 checks whether the medium size check flag 56 is ON or OFF. In this regard, the medium size check flag 56 has been set to ON (by the host device 10) when the partial execution of the medium size check is selected as described above. If the medium size check flag 56 is ON (YES in step S12), the control unit 52 proceeds to step S18 (i.e., the printing operation).

If the medium size check flag 56 is OFF (NO in step S12), the control unit 52 proceeds to step S13. In step S13, the control unit 52 determines whether the medium size check mode data JD1 contained in the print job data JD is 1 or not. If the medium size check mode data JD1 is not 1 (NO in step S13), the control unit 52 determines that the medium size check is not to be executed (step S15), and proceeds to step S18.

If the control unit 52 determines that the medium size check mode data JD1 is 1 (YES in step S13), the control unit 52 proceeds to step S14. In step S14, the control unit 52 (more specifically, the first determining unit 501) checks whether the drawing image size JD2 contained in the print job data JD is the same as (i.e., corresponds to) the size of the recording media KB (stored in the selected tray 23) recognized by the image forming apparatus 20. In this regard, the "selected tray 23" is one of the trays 22, 23-1, 23-2 and 23-3 selected based on the user's selection via the menu (i.e., the touch panel 37A).

In this regard, the image forming apparatus 20 can be configured to recognize the size of the recording media KB stored in the selected tray 23 by, for example, automatically detects the size of the recording medium KB using a medium size detection unit. In this embodiment, the image forming apparatus 20 recognizes the size of the recording media KB stored in the selected tray 23 based on settings set by the user via the menu (i.e., the touch panel 37A) or the size setting dial 23f shown in FIG. 3.

If the drawing image size JD2 is the same as the size of the recording medium KB recognized by the image forming apparatus 20 (YES in step S14), the control unit 52 proceeds to step S18. If the drawing image size JD2 is different from the size of the recording medium KB recognized by the image forming apparatus 20 (NO in step S14), the control unit 52 proceeds to step S16, and notifies the user that the size of the recording media KB stored in the selected tray 23 is not the same as the drawing image size JD2. For example, the control unit 52 displays a notice on the touch panel 37A (FIG. 3) prompting the user to replace the recording media KB stored in the selected tray 23 with the recording media KB of the same as the drawing image size JD2 contained in the print job data JD.

Then, the control unit 52 checks whether the recording media KB stored in the selected tray 23 are replaced or not (step S17). In this regard, if the image forming apparatus 20 has the medium size detection unit, the control unit 52 can recognize whether the recording media KB are replaced or not based on output of the medium size detection unit. If the image forming apparatus 20 does not have such a medium size detection unit, the control unit 52 recognizes whether the recording media KB are replaced or not based on whether the replacement finish button 37g (FIG. 3) of the operation panel 37 is pressed or not. It is also possible to provide an exclusive switch on other than the operation panel 37.

Then, the control unit 52 again checks whether the drawing image size JD2 contained in the print job data JD is the same as the size of the recording media KB (stored in the selected tray 23) recognized by the image forming apparatus 20 (step S14). If the drawing image size JD2 is the same as the size of the recording medium KB recognized by the image forming apparatus 20 (YES in step S14), the control unit 52 proceeds to step S18.

In this regard, it is also possible that the control unit 52 proceeds from step S17 to step S18 directly (i.e., without proceeding to step S14) as shown by a dashed line in FIG. 11A on the assumption that the recording media KB in the selected tray 23 have been replaced with those of a correct size.

In step S18, the control unit 52 execute the printing operation using the engine unit 61 via the engine control unit 60. After the printing operation (S18) is completed, the control unit 52 checks whether there remains any print job data. Steps S12 through S18 are repeated until the control unit 52 determines that there remains no print job data in step S19. If the control unit 52 determines that there remains no print job data in step S19, the control unit 52 ends the processing.

Figure 11B:
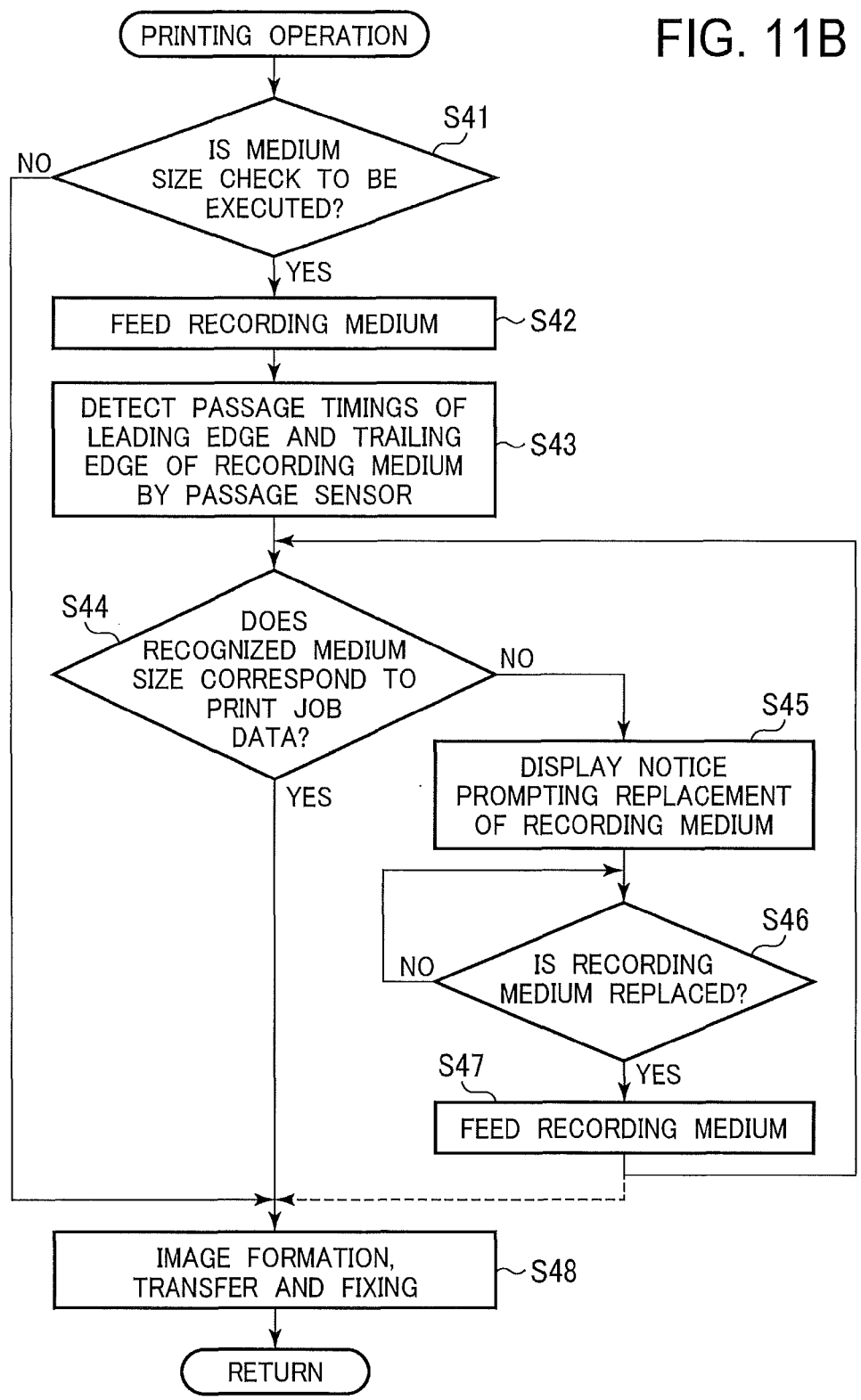
FIG. 11B is a flowchart showing a printing operation executed by the image forming apparatus shown in FIG. 4.

FIG. 11B is a flowchart showing processing of step S18 (i.e., the printing operation) in FIG. 11A.

When the printing operation starts, the control unit 52 determines whether or not to execute the medium size check based on the medium size check mode data al (step S41). If the control unit 52 determines that the medium sire check is not to be executed (NO in step S41), the control unit 52 proceeds to step S48.

If the control unit 52 determines that the medium size check is to be executed (YES in step S41), the control unit 52 proceeds to step. S42. In step S42, the control unit 52 causes the engine control unit 60 to rotate the hopping roller 23b of the selected tray 23 and the delivery rollers 23c and the feeding rollers 24 so as to feed the recording medium KB from the selected tray 23. Then, the control unit 52 obtains a timing at which the leading edge of the recording medium KB is detected by the passage sensor 24a, and obtains a timing at which the trailing edge of the recording medium KB is detected by the passage sensor 24a (step S43). The control unit 52 recognizes the length of the recording medium KB (and therefore the size of the recording medium KB) based on the timings obtained in step S43 and a feeding speed of the recording medium KB.

Then, the control unit 52 (more specifically, the second determining unit 502) checks whether the drawing image size JD2 contained in the print job data JD is the same as the size of the recording medium KB (which is fed by the feeding rollers 24) recognized by the image forming apparatus 20 (step S44).

If the drawing image size JD2 is the same as the size of the recording medium. KB recognized by the image forming apparatus 20 (YES in step S44), the control unit 52 proceeds to step S48. If the drawing image size JD2 is different from the size of the recording medium KB recognized by the image forming apparatus 20 (NO in step S44), the control unit 52 proceeds to step S46, and notifies the user that the detected size of the recording medium KB is not the same as the drawing image size JD2. For example, the control unit 52 displays a notice on the touch panel 37A shown in FIG. 3 prompting the user to replace the recording media KB stored in the selected tray 23 with the recording media KB of the same as the drawing image size JD2 contained in the print job data JD.

Then, the control unit 52 checks whether the recording media KB stored in the selected tray 23 are replaced or not (step S45) as in step S17 of FIG. 11A.

Then, the control unit 52 causes the engine control unit 60 to feed the recording medium KB, and obtains a timing at which the leading edge of the recording medium KB is detected by the passage sensor 24a and a timing at which the trailing edge of the recording medium KB is detected by the passage sensor 24a (step S43). Further, the control unit 52 again checks whether the drawing image size JD2 contained in the print job data JD is the same as the size of the recording medium KB recognized by the image forming apparatus 20 (step S44). If the drawing image size JD2 is the same as the size of the recording medium KB recognized by the image forming apparatus 20 (YES in step S44), the control unit 52 proceeds to step S48.

In this regard, it is also possible that the control unit 52 proceeds from step S47 to step S48 directly (i.e., without proceeding to steps S43 and S44) as shown by a dashed line in FIG. 11B on the assumption that the recording media KB in the selected tray 23 have been replaced with those of a correct size.

In step S48, the control unit 52 causes the engine control unit 60 to form a toner image by the image forming unit 25, transfer the toner image to the recording medium KB by the transfer roller 32, fix the toner image to the recording medium KB by the fixing unit 33, and eject the recording medium KB to the stacker 36 by the ejection rollers 34 and 35.

In this embodiment, the medium size check mode can be selected using the setting screen (FIG. 7) of the printer driver of the host device 10, or using the menu (i.e., the touch panel 37A) of the image forming apparatus 20.

If the image forming apparatus 20 is shared by a plurality of users, it is preferred to display information indicating which of the medium size check modes is currently selected. Such information can be displayed on the operation panel 37, a web page or a status monitor. It is also preferred that the user can select whether or not to display the information indicating the currently selected medium size check mode.

<Advantage of Embodiment 1>

According to Embodiment 1 of the present invention, when the medium size check mode "3" is selected, the medium size check is executed only in the printing operation (step S18 in FIG. 11A). Therefore, after the user replaces the recording media KB stored in the tray 23 with those of a different size, the printing operation (i.e., image formation) is executed even when the user fails to change the setting of the size of the recording media KB via the menu (i.e., the touch panel 37A) or the size setting dial 23f. Further, the occurrence of the operational problem is prevented since the medium size check is executed during the printing process. As a result, the image formation can be executed without causing the operational problem, even when the user fails to change (or does not correctly change) the setting of the size of the recording medium KB via the menu (i.e., the touch panel 37A) or the size setting dial 23f.

Embodiment 2

<Configuration of Embodiment 2>

Figure 12:
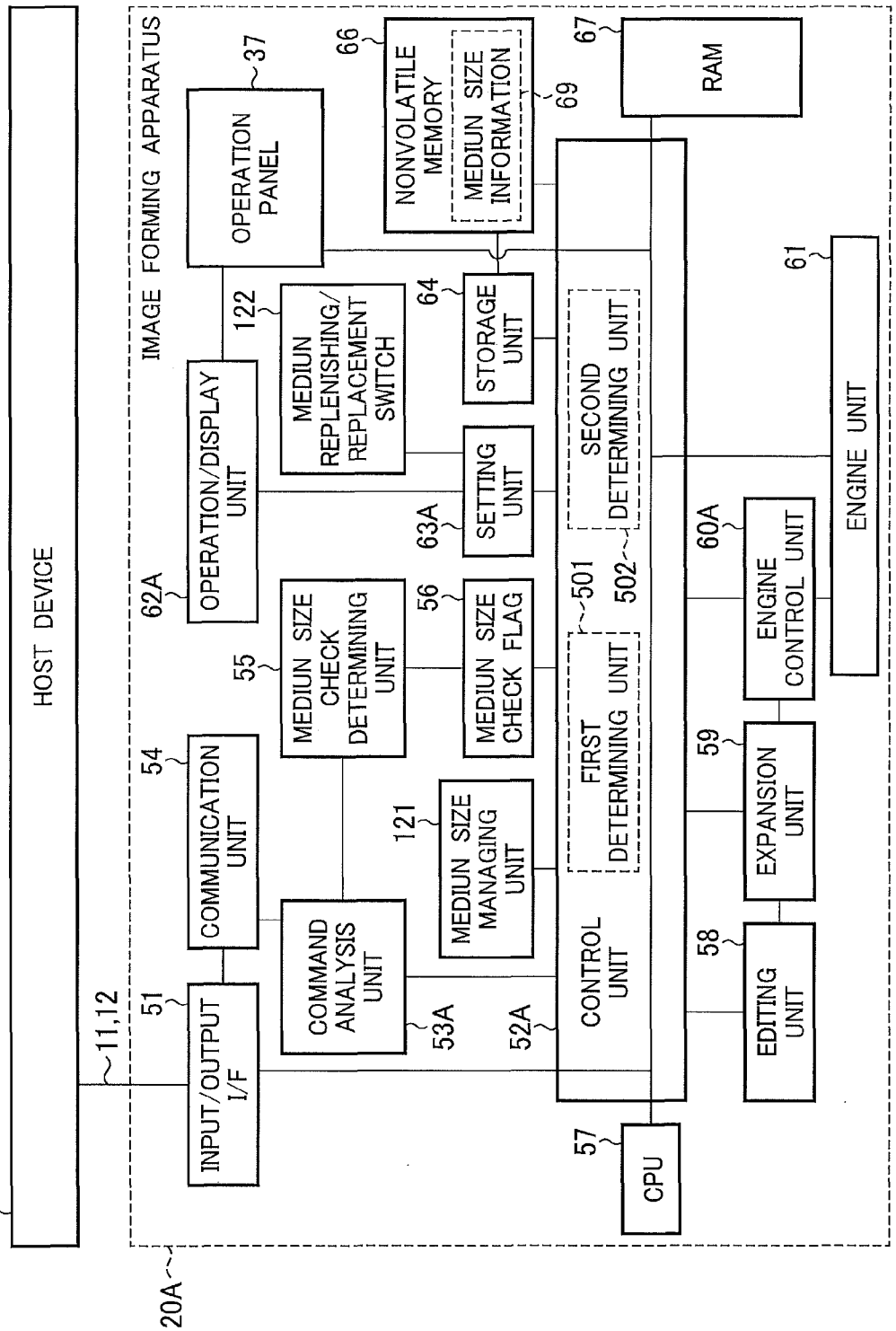
FIG. 12 is a block diagram showing a configuration of the image forming apparatus according to Embodiment 2 of the present invention.

FIG. 12 is a block diagram showing a configuration of an image forming apparatus 20A according to Embodiment 2 of the present invention. In FIG. 12, components which are the same as those of Embodiment 1 are assigned with the same reference numerals.

An image forming system of Embodiment 2 includes the host devices 10 and the image forming apparatus 20A. The host devices 10 of Embodiment 2 are the same as those of Embodiment 1. The image forming apparatus 20A of Embodiment 2 is different from the image forming apparatus 20 of Embodiment 1 in configuration and function. The host devices 10 and the image forming apparatus 20A are communicably connected to one another using the local port interface 11 and the network interface 12.

The image forming apparatus 20A includes the input/output interface 51, the communication unit 54, the medium size check determining unit 55, the medium size check flag 56, the CPU 57, the engine unit 61, the storage unit 64, the nonvolatile memory 66, the RAM 67 and the operation panel 37 which are the same as those of Embodiment 1. The image forming apparatus 20A further includes a control unit 52A, a command analysis unit 53A, an engine control unit 60A and an operation/display unit 62A which are respectively different from the control unit 52, the command analysis unit 53, the engine control unit 60 and the operation/display unit 62 of Embodiment 1. The image forming apparatus 20A further includes a medium size managing unit 121 and a medium replenishing/replacement switch 122 which are not provided in Embodiment 1.

The control unit 52A communicates with the host devices 10, the engine control unit 60A, and the engine unit 61. The control unit 52A controls an entire operation of the image forming apparatus 20A, and manages all interfaces provided inside and outside the image forming apparatus 20A. The control unit 52A is connected to the command analysis unit 53A.

The command analysis unit 53A analyzes data transmitted from the host device 10. The command analysis unit 53A analyzes the print job data JD, and obtains the medium size check mode data JD1 and the drawing image size JD2 contained in the print job data JD as with the command analysis unit 53 of Embodiment 1. The command analysis unit 53A is connected to the communication unit 54 and the medium size managing unit 121.

The engine control unit 60A is connected to the control unit 52A and the engine unit 61. The engine control unit 60A transmits the print job data JD and setting data (analyzed by the control unit 52 and the expansion unit 59) to the engine unit 61. The engine control unit 60A monitors conditions of the recording media KB stored in the trays 23-1, 23-2 and 23-3 and the manual tray 22. More specifically, the engine control unit 60A monitors information of the recording medium KB, absence of the recording medium KB, change in size of the recording media KB (when the recording media KB are replenished or replaced), occurrence of jam error or the like in each of the trays 23-1, 23-2 and 23-3 and the manual tray 22. The engine control unit 60A transmits monitoring information to the control unit 52A.

The operation/display unit 62A transmits setting information (set using the operation panel 37) to the control unit 52A via the setting unit 63A. The setting unit 63A sets parameters of the operation of the image forming apparatus 20A. The parameters are set by selectively turning on/off respective functions using the menu screen or the like. The setting unit 63A transmits the parameters to the storage unit 64.

The medium size managing unit 121 manages information on the size of the recording medium KB. More specifically, the medium size managing unit 121 manages the size of the recording medium KB determined by the print job data JD, and the size of the recording medium KB determined by user's selection via the menu (i.e., the touch panel 37A) or the size setting dial 23f of the image forming apparatus 20, and also manages similarity and difference between the sizes. The medium size managing unit 121 is connected to the control unit 52A and the command analysis unit 53A.

The medium replenishing/replacement switch 122 is used to notify the image forming apparatus 20A that the recording media KB are replaced or replenished. The medium replenishing/replacement switch 122 is connected to the setting unit 63A.

Other configurations of the image forming apparatus 20A and the image forming system of Embodiment 2 are the same as those of the image forming apparatus 20 and the image forming system of Embodiment 1.

<Operation of Embodiment 2>

The operation of the host device 10 of Embodiment 2 is the same as that of the host device 10 of Embodiment 1, and therefore explanations thereof will be omitted.

Figure 13:
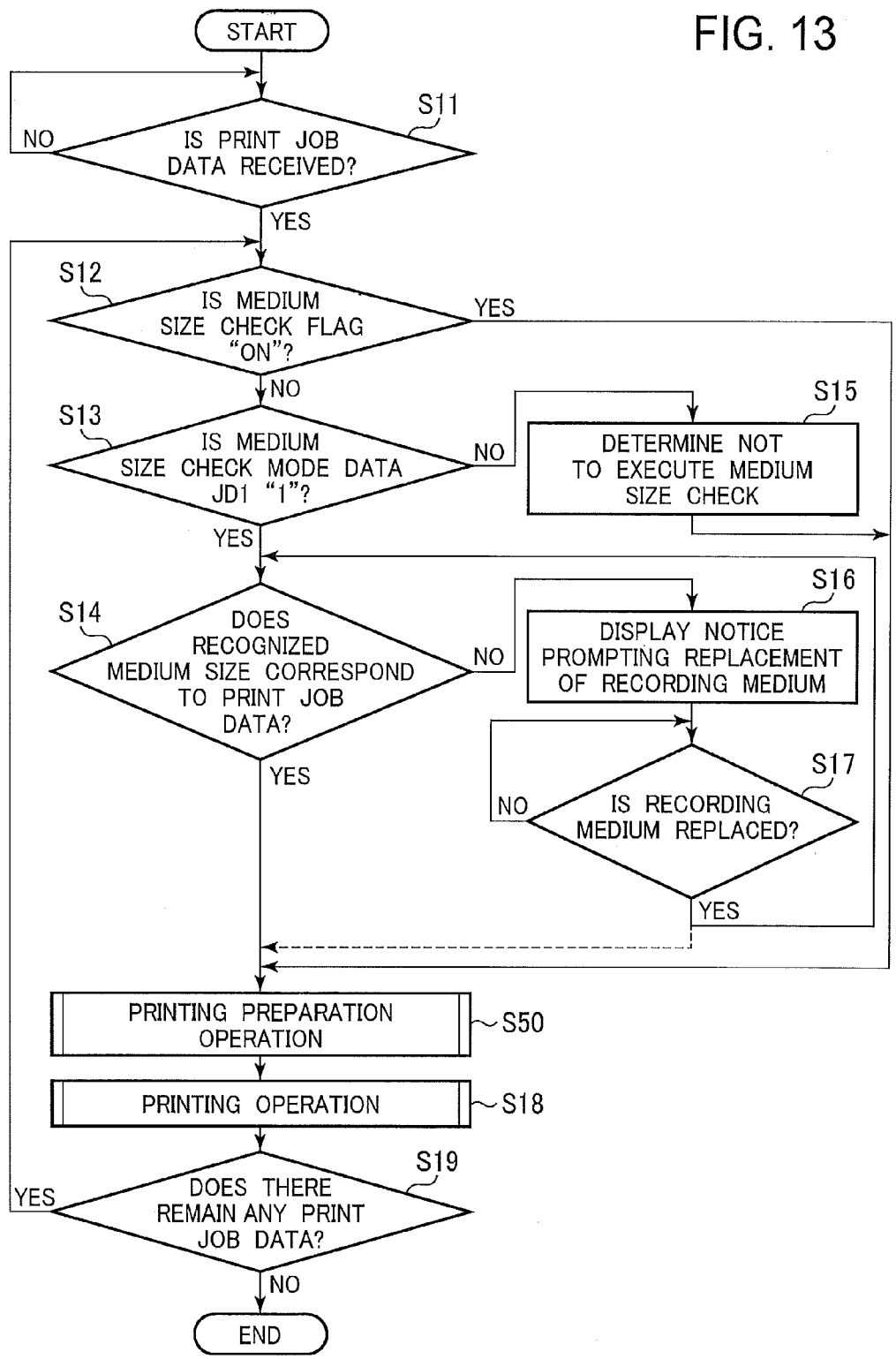
FIG. 13 is a flowchart showing processing of executed by the image forming apparatus shown in FIG. 12.

FIG. 13 is a flowchart showing processing executed by the image forming apparatus 20A. In FIG. 13, steps which are the same as those of Embodiment 1 are assigned with the same reference numerals.

When the processing of the image forming apparatus 20A starts, the control unit 52A executes processing of steps S11 through S17 which are the same as those of Embodiment 1 (FIG. 11A), and proceeds to step S50 (i.e., a printing preparation operation) described later. After the control unit 52A completes the printing preparation operation (step S50), the control unit 52A proceeds to step S18 (i.e., the printing operation) described in Embodiment 1, and proceeds to step S19. In step S19, the control unit 52A determines whether there remains any print job data. Steps S12 through S19 are repeated until the control unit 52A determines that there remains no print job data in step S19. If the control unit 52A determines that there remains no print job data in step S19, the control unit 52A ends the processing.

Figure 14:
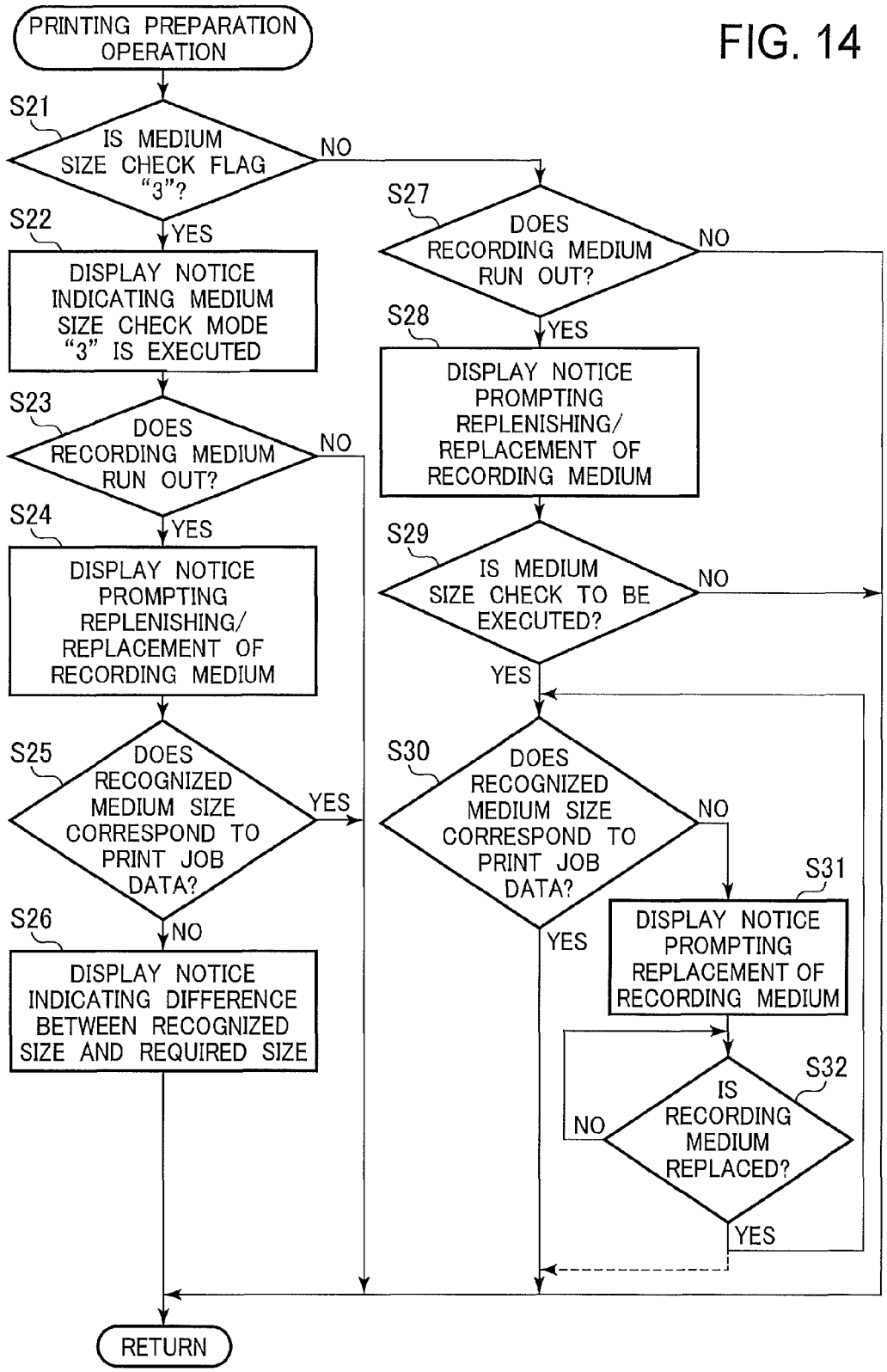
FIG. 14 is a flowchart showing a printing preparation operation executed in step S50 shown in FIG. 13.

FIG. 14 is a flowchart showing processing of step S50 (i.e., the printing preparation operation) of FIG. 13. FIGS. 15A, 15B and 15C are schematic views showing examples of display contents displayed on the user interface such as the touch panel 37A (FIG. 3) of the image forming apparatus 20A. FIG. 15A shows an example of display contents in a normal operation. FIG. 15B shows an example of display contents during the medium size check mode "3". FIG. 15C shows another example of display contents during the medium size check mode "3". The printing preparation operation of the step S50 (FIG. 13) will be described with reference to FIGS. 14, 15A, 15B and 15C.

In the printing preparation operation of FIG. 14, when the recording medium KB of the selected tray 23 runs out, the image forming apparatus 20A prompts the user to replenish or replace the recording medium KB via the user interface such as the touch panel 37A (FIG. 3) of the image forming apparatus 20A.

When the printing preparation operation starts, the control unit 52A causes the command analysis unit 53A to check whether the medium size check mode data DJ1 is 3 (i.e., the medium size check mode "3") or not (step S21). If the medium size check mode data DJ1 is 3 (Yes in step S21), the control unit 52A proceeds to step S22. If the medium size check mode data DJ1 is not 3 (NO in step S21), the control unit 52A proceeds to step S27.

In step S22, the control unit 52A causes the operation/display unit 62A to display a notice indicating that the medium size check mode "3" is selected. This notice is displayed on, for example, the touch panel 37A (FIG. 3).

In a normal operation, the control unit 52A causes the operation/display unit 62A to displays the contents shown in FIG. 15A. In this example, a notice "Printing 2/5 Page Job" is displayed in the first line, and another notice "Please Prepare to Replace Toner Cartridge" is displayed in the second line.

In contrast, in step S22, the operation/display unit 62A displays the notice indicating the selected medium size check mode as shown in FIG. 15B. In this example, a notice "Printing 2/5 Page Job [Medium Size Check—Mode 3]" is displayed in the first line, and another notice "Please Prepare to Replace Toner Cartridge" is displayed in the second line.

Then, the control unit 52A checks whether the recording medium KB in the selected tray 23 has run out (step S23). If the recording medium KB in the selected tray 23 has not run out (NO in step S23), the control unit 52A ends the printing preparation operation of FIG. 14 and returns to step S50 of FIG. 13. If the recording medium KB in the selected tray 23 has run out (YES in step S23), the control unit 52A proceeds to step S24. In step S24, the control unit 52A causes the operation/display unit 62A to display a notice for prompting the user to replenish or replacement the recording medium KB on the touch panel 37A, and waits for the recording medium KB to be replenished or replaced (step S24). Then, the control unit 52A determines whether the drawing image size JD2 contained in the print job data JD is the same as the size of the recording medium KB recognized by the image forming apparatus 20A (step S25). In this regard, the image forming apparatus 20A (i.e., the control unit 52A) recognizes the size of the recording media KB based on, for example, the setting via the menu (i.e., the touch panel 37A) or the size setting dial 23f (FIG. 4) as described in Embodiment 1.

If the drawing image size JD2 is the same as the size of the recording medium KB recognized by the image forming apparatus 20A (YES in step S25), the control unit 52A ends the printing preparation operation of FIG. 14 and returns to step S50 of FIG. 13. If the drawing image size JD2 is different from the size of the recording medium KB recognized by the image forming apparatus 20A (NO in step S25), the control unit 52A causes the operation/display unit 62A to display the drawing image size JD2 and the size of the recording medium KB recognized by the image forming apparatus 20A (step S26).

For example, if the drawing image size JD2 contained in the print job data JD is A4 size, but the size of the recording media KB (stored in the selected tray 23) recognized by the image forming apparatus 12A (i.e., the control unit 52A) is a letter size, the control unit 52A causes the operation/display unit 62A to display "Printing 2/5 Page Job [Medium Size Check—Mode 3]" in the first line, and "Job Data Size: A4, Apparatus Set Size: Letter" in the second line as shown in FIG. 15C.

Then, the control unit 52A ends the printing preparation operation of FIG. 14 and returns to step S50 of FIG. 13.

In the above described step S21, if the medium size check mode data JD1 is not 3 (NO in step S21), the control unit 52A proceeds to step S27. In step S27, the control unit 52A checks whether the recording medium KB in the selected tray 23 has run out (step S27). If the recording medium KB in the tray 23 has not run out (NO in step S27), the control unit 52A ends the printing preparation operation of FIG. 14 and returns to step S50 of FIG. 13. If the recording medium KB in the tray 23 has run out (YES in step S27), the control unit 52A proceeds to step S28. In step S28, the control unit 52A causes the operation/display unit 62A to display a notice for prompting the user to replenish or replacement the recording media KB on the touch panel 37A, and waits for the recording medium KB to be replenished or replaced.

Then, the control unit 52A determines whether the medium size check mode data JD1 is 1 (i.e., the medium size check mode "1") or not (step S29). If the medium size check mode data JD1 is 1 (YES in step S29), the control unit 52A proceeds to step S30. If the medium size check mode is not 1 (NO in step S29), the control unit 52A ends the printing preparation operation of FIG. 14 and returns to step S50 of FIG. 13. That is, if the medium size check mode is 2 (i.e., the inexecution of the medium size check), the printing is executed even when the drawing image size JD2 contained in the print image data JD is different from the size of the recording media KB (stored in the selected tray 23) recognized by the image forming apparatus 20.

In step S30, the control unit 52A determines whether the drawing image size JD2 contained in the print image data JD is the same as the size of the recording media KB (stored in the selected tray 23) recognized by the image forming apparatus 20. If the drawing image size JD2 is the same as the size of the recording media KB (stored in the selected tray 23) recognized by the image forming apparatus 20 (YES in step S30), the control unit 52A ends the printing preparation operation of FIG. 14 and returns to step S50 of FIG. 13. If the drawing image size JD2 is not the same as the size of the recording media KB (stored in the selected tray 23) recognized by the image forming apparatus 20 (NO in step S30), the control unit 52A proceeds to step S31. In step S31, the control unit 52A causes the operation/display unit 62A to display a notice on the touch panel 37A prompting the user to replace the recording media KB (stored in the selected tray 23) with the recording media whose size is the same as the drawing image size JD2 contained in the print job data.

Then, the control unit 52A determines whether the recording media KB are replaced or not (step S32). If the recording media KB have been replaced, the control unit 52A proceeds to step S30. In this regard, if the image forming apparatus 20A has a medium size detection unit, the control unit 52A can recognize whether the recording media KB are replaced or not using the medium size detection unit. If the image forming apparatus 20A does not have such a medium size detection unit, the control unit 52A can recognize whether the recording media KB are replaced or not based on whether the replacement finish button 37g of the operation panel 37 is pressed or not (FIG. 3). It is also possible provide an exclusive switch on other than the operation panel 37.

In step S30, the control unit 52A again checks whether the drawing image size JD2 contained in the print job data JD is the same as the size of the recording media KB (stored in selected the tray 23) recognized by the image forming apparatus 20. If the drawing image size JD2 is the same as the size of the recording medium KB recognized by the image forming apparatus 20 (YES in step S30), the control unit 52 ends the printing preparation operation of FIG. 14 and returns to step S50 shown in FIG. 13.

In this regard, it is also possible that the control unit 52 proceeds from step S32 to step S50 (FIG. 13) directly (i.e., without proceeding to step S30) as shown by a dashed line in FIG. 15 on the assumption that the recording media KB in the selected tray 23 have been replaced with those of a correct size.

<Advantage of Embodiment 2>

According to Embodiment 2 of the present invention, the same advantages as Embodiment 1 can be obtained. Further, according to Embodiment 2, the image forming apparatus 20 displays that the medium size check mode "3" is selected, and if the drawing image size JD2 contained in the print job data JD is different from the size of the recording media KB recognized by the image forming apparatus 20, the image forming apparatus 20 notifies the user that the sizes are different. Therefore, the user (or users sharing the image forming apparatus 20) can recognize a difference between the drawing image size JD2 and the size of the recording media KB (stored in the tray 23) recognized by the image forming apparatus 20. Accordingly, the printing operation can be executed while preventing operational problem.

The present invention is not limited to the above described Embodiments 1 and 2, but various modifications and improvements may be made.

Figure 16:
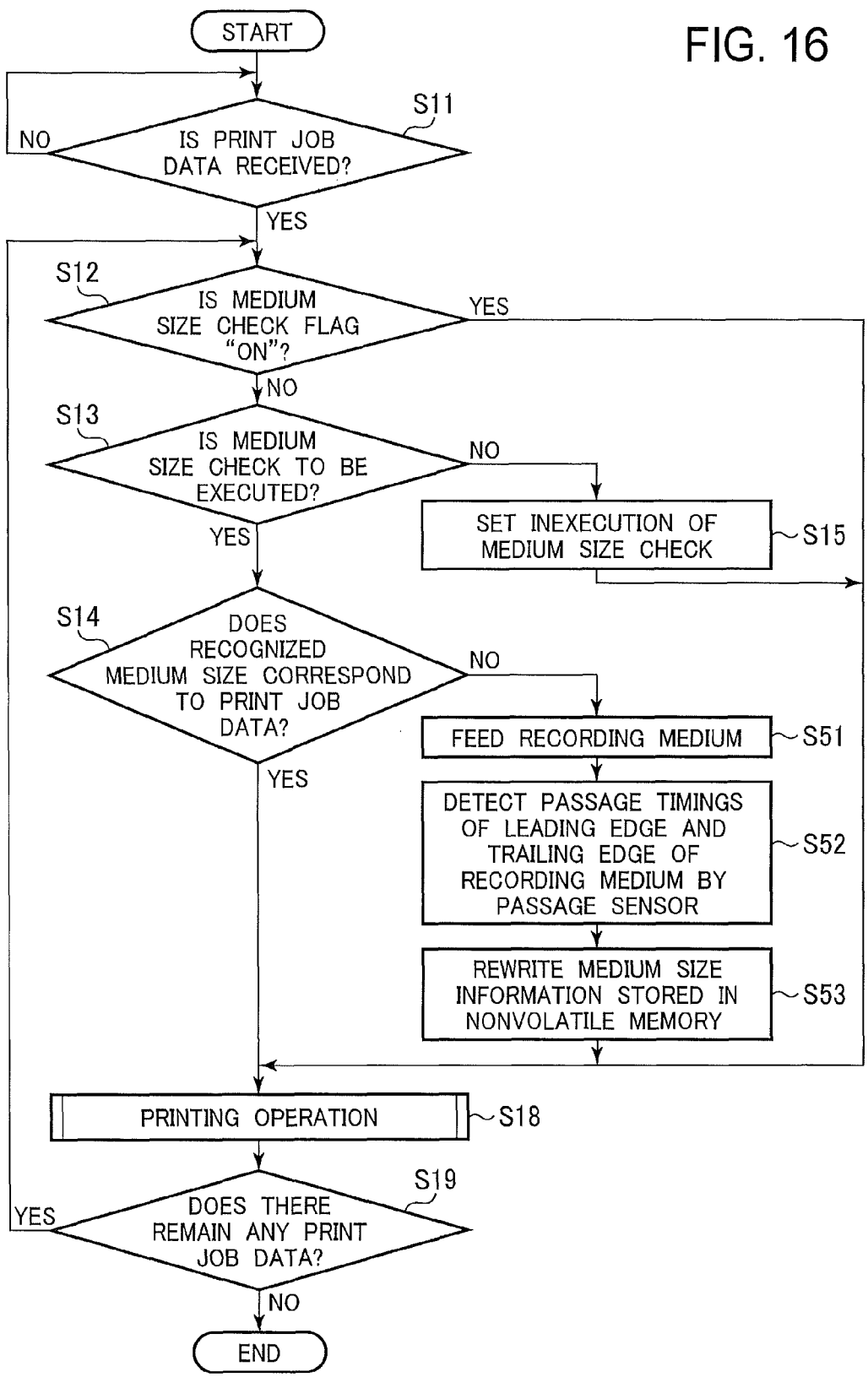
FIG. 16 is a flowchart showing a modification of processing executed by the image forming apparatus.

For example, FIG. 16 is a flowchart showing a modification of the processing of FIG. 11A. In the flowchart shown in FIG. 16, steps S11 through S14 are the same as those of FIG. 11A. In step S14, if the control unit 52 (more specifically, the first determining unit 501) determines that the drawing image size JD2 contained in the print job data JD is different from the size of the recording media KB (stored in the selected tray 23) recognized by the image forming apparatus 20, the control unit 52 causes the engine control unit 60 to feed the recording medium KB (step S51), obtains a timing at which the leading edge of the recording medium KB is detected by the passage sensor 24a and a timing at which the trailing edge of the recording medium KB is detected by the passage sensor 24a (step S52). Then, the control unit 52 (i.e., a rewriting unit) rewrites information indicating the size of the recording medium KB (i.e., the medium size information 69) stored in the nonvolatile memory 66 (FIG. 4) to the size of the recording medium KB obtained using the passage sensor 24a (step S53). Then, the control unit 52 proceeds to the step S18 (i.e., the printing operation) as described with reference to FIG. 11A.

Further, in Embodiments 1 and 2, the drawing image size JD2 contained in the print job data JD is compared with the size of the recording medium KB stored in the tray 23 and recognized by the image forming apparatus 20. However, it is also possible to compare thickness, material or format of the recording medium KB required by the print job data and thickness, material or format of the recording media KB stored in the tray 23.

Further, in Embodiments 1 and 2, the medium size check modes 1, 2 and 3 are provided as shown in FIGS. 8 and 9. However, the number of the medium size check modes is not limited to three, but can be modified according to a user's application.

Further, in Embodiments 1 and 2, the print job data JD is created by the print job data creation unit 80 of the host device 10. In the image forming apparatuses 20 and 20A, the command analysis unit 53 and the medium size check determining unit 55 analyze the print job data JD to obtain the medium size check mode. However, the medium size check mode is not necessarily contained in the print job data JD. For example, it is also possible to provide a menu screen on the image forming apparatuses 20 and 20A with which the user can directly specify the medium size check mode.

Further, in Embodiments 1 and 2, the image forming apparatus 20 has been described as the printer. However, the present invention is applicable to an image forming such as an MFP (Multi-Function Peripheral), a facsimile machine, a scanner, an issuing device for certificates, checks, exchanges and travelers checks.

While the preferred embodiments of the present invention have been illustrated in detail, it should be apparent that modifications and improvements may be made to the invention without departing from the spirit and scope of the invention as described in the following claims.

What is claimed is:

1. An image forming apparatus comprising:
   a medium storing portion storing a recording medium;
   a storage unit that stores first size information indicating a size of the recording medium stored in the medium storage portion;
   a receiving unit that receives print data from an external device, the print data containing image data and second size information indicating a size relating to the image data;
   a feeding unit that feeds the recording medium from the medium storage portion;
   an image forming unit that forms an image on the recording medium fed by the feeding unit;
   a detection unit that detects a size of the recording medium fed by the feeding unit to obtain third size information;
   a first determining unit that determines whether the first size information stored in the storage unit corresponds to the second size information contained in the print data;
   a second determining unit that determines whether the third size information obtained using the detection unit corresponds to the second size information contained in the print data;
   an acquiring unit that acquires determination instruction information; and
   a determination control unit configured to control the first determining unit and the second determining unit according to the determination instruction information acquired by the acquiring unit, including
   in one operation mode, to cause the second determining unit to perform determination without causing the first determining unit to perform determination, and
   in another operation mode, to cause both the first determining unit and the second determining unit to perform determination.

2. The image forming apparatus according to claim 1, wherein the second size information indicates a size of the recording medium on which an image data is to be printed according to the print data.

3. The image forming apparatus according to claim 1, wherein the second size information indicates a drawing size of the image data.

4. The image forming apparatus according to claim 1, wherein when at least one of the first determining unit and the second determining unit determines that the first size information or the third size information does not correspond to the second size information, the determination control unit notifies a user that the first size information or the third size information does not correspond to the second size information.

5. The image forming apparatus according to claim 1, wherein the determination control unit is further configured to operate in
yet another operation mode in which neither the first determining unit nor the second determining unit performs determination.

6. The image forming apparatus according to claim 1, further comprising rewriting unit,
wherein when the first determining unit determines that the first size information does not correspond to the second size information, the rewriting unit causes the detection unit to detect the size of the recording medium to obtain the third size information, and rewrites the first size information to the third size information.

7. The image forming apparatus according to claim 1, wherein the print data contains the determination instruction information, and
wherein the acquiring unit analyzes the print data and obtains the determination instruction information.

8. An image forming system comprising an image forming apparatus and an information processing apparatus communicably connected with each other,
the image forming apparatus comprising:
a medium storing portion storing a recording medium;
a storage unit that stores first size information indicating a size of the recording medium stored in the medium storage portion;
a receiving unit that receives print data from an image processing apparatus, the print data containing image data and second size information indicating a size relating to the image data;
a feeding unit that feeds the recording medium from the medium storage portion;
an image forming unit that forms an image on the recording medium fed by the feeding unit;
a detection unit that detects a size of the recording medium fed by the feeding unit to obtain third size information;
a first determining unit that determines whether the first size information stored in the storage unit corresponds to the second size information contained in the print data;
a second determining unit that determines whether the third size information obtained using the detection unit corresponds to the second size information contained in the print data;
an acquiring unit that analyzes the print data to acquire determination instruction information; and
a determination control unit configured to control the first determining unit and the second determining unit according to the determination instruction information acquired by the acquiring unit, including
in one operation mode, to cause the second determining unit to perform determination without causing the first determining unit to perform determination, and
in another operation mode, to cause both the first determining unit and the second determining unit to perform determination;
the image processing apparatus comprising:
a specifying unit that specifies to cause the second determining unit to perform determination without causing the first determining unit to perform determination;
a creation unit that creates the print data based on the image data, the second size information and the determination instruction information according to a result of specification by the specifying unit; and
a transmitting unit transmits the print data created by the creation unit to the image forming apparatus.

9. The image forming system according to claim 8, wherein the determination control unit is further configured to operate in
yet another operation mode in which neither the first determining unit nor the second determining unit performs determination.

10. The image forming system according to claim 9, wherein the information processing apparatus further comprises a display unit,
wherein the specifying unit causes the display unit to display the one operation mode, the another operation mode and the yet another operation mode to allow a user to select one of the three modes.

11. The image forming system according to claim 10, wherein the specifying unit causes the display unit to display the one operation mode, the another operation mode and the yet another operation mode to allow a user to select one of the three modes while the specifying unit specifies the one operation mode by default.

* * * * *